(12) United States Patent
Yuki et al.

(10) Patent No.: US 11,016,274 B2
(45) Date of Patent: May 25, 2021

(54) FIXED FOCAL LENGTH LENS AND IMAGE PICKUP APPARATUS

(71) Applicant: CANON KABUSHIKI KAISHA, Tokyo (JP)

(72) Inventors: Akihiko Yuki, Utsunomiya (JP); Shohei Kikuchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 342 days.

(21) Appl. No.: 16/142,546

(22) Filed: Sep. 26, 2018

(65) Prior Publication Data

US 2019/0101732 A1 Apr. 4, 2019

(30) Foreign Application Priority Data

Sep. 29, 2017 (JP) .............................. JP2017-189811

(51) Int. Cl.
| | |
|---|---|
| *G02B 13/00* | (2006.01) |
| *G02B 13/04* | (2006.01) |
| *G02B 9/12* | (2006.01) |
| *G02B 13/18* | (2006.01) |
| *G02B 9/34* | (2006.01) |

(Continued)

(52) U.S. Cl.
CPC .............. *G02B 13/04* (2013.01); *G02B 7/04* (2013.01); *G02B 9/12* (2013.01); *G02B 9/34* (2013.01); *G02B 13/18* (2013.01); *G02B 5/005* (2013.01)

(58) Field of Classification Search
CPC .......... G02B 9/34; G02B 13/18; G02B 13/04; G02B 5/005; G02B 9/12; G02B 7/04

USPC ........ 359/715, 716, 740, 748, 772, 781, 784
See application file for complete search history.

(56) References Cited

U.S. PATENT DOCUMENTS

| 9,069,156 B2 | 6/2015 | Ito et al. |
| 9,310,589 B2 | 4/2016 | Wakazono et al. |
| 9,904,044 B2 | 2/2018 | Kikuchi et al. |

(Continued)

FOREIGN PATENT DOCUMENTS

| JP | 2006201526 A | 8/2006 |
| JP | 2014048488 A | 3/2014 |

(Continued)

OTHER PUBLICATIONS

Notice of Reasons for Refusal issued by the Japanese Patent Office in corresponding Japanese Patent Application No. 2017-189811 dated Jul. 18, 2019 with English translation.

*Primary Examiner* — Evelyn A Lester

(74) *Attorney, Agent, or Firm* — Carter, DeLuca & Farrell LLP

(57) ABSTRACT

A fixed focal length lens includes, in order from an object side, a first lens unit having a positive refractive power, a second lens unit having a positive refractive power and a third lens unit having a positive refractive power, the second lens unit and the third lens unit moving for focusing differently from each other to change a distance between each pair of adjacent lens units changes. The first lens unit includes, in order from the object side to the image side, a first lens having a negative refractive power and a second lens having a negative refractive power. A focal length of the fixed focal length lens in a case of focusing on an object at infinity, a focal length of the first lens unit, a focal length of the second lens unit and a focal length of the third lens unit are appropriately set.

17 Claims, 15 Drawing Sheets

(51) Int. Cl.
    *G02B 7/04*    (2021.01)
    *G02B 5/00*    (2006.01)

(56)    References Cited

U.S. PATENT DOCUMENTS

| 2009/0323200 | A1* | 12/2009 | Sudoh | G02B 13/04 |
| | | | | 359/691 |
| 2015/0177499 | A1 | 6/2015 | Yuki | |
| 2015/0362710 | A1 | 12/2015 | Kikuchi | |
| 2016/0282590 | A1* | 9/2016 | Saito | G02B 13/04 |

FOREIGN PATENT DOCUMENTS

| JP | 2015114366 A | 6/2015 |
| JP | 2016180851 A | 10/2016 |
| JP | 2017015941 A | 1/2017 |

* cited by examiner

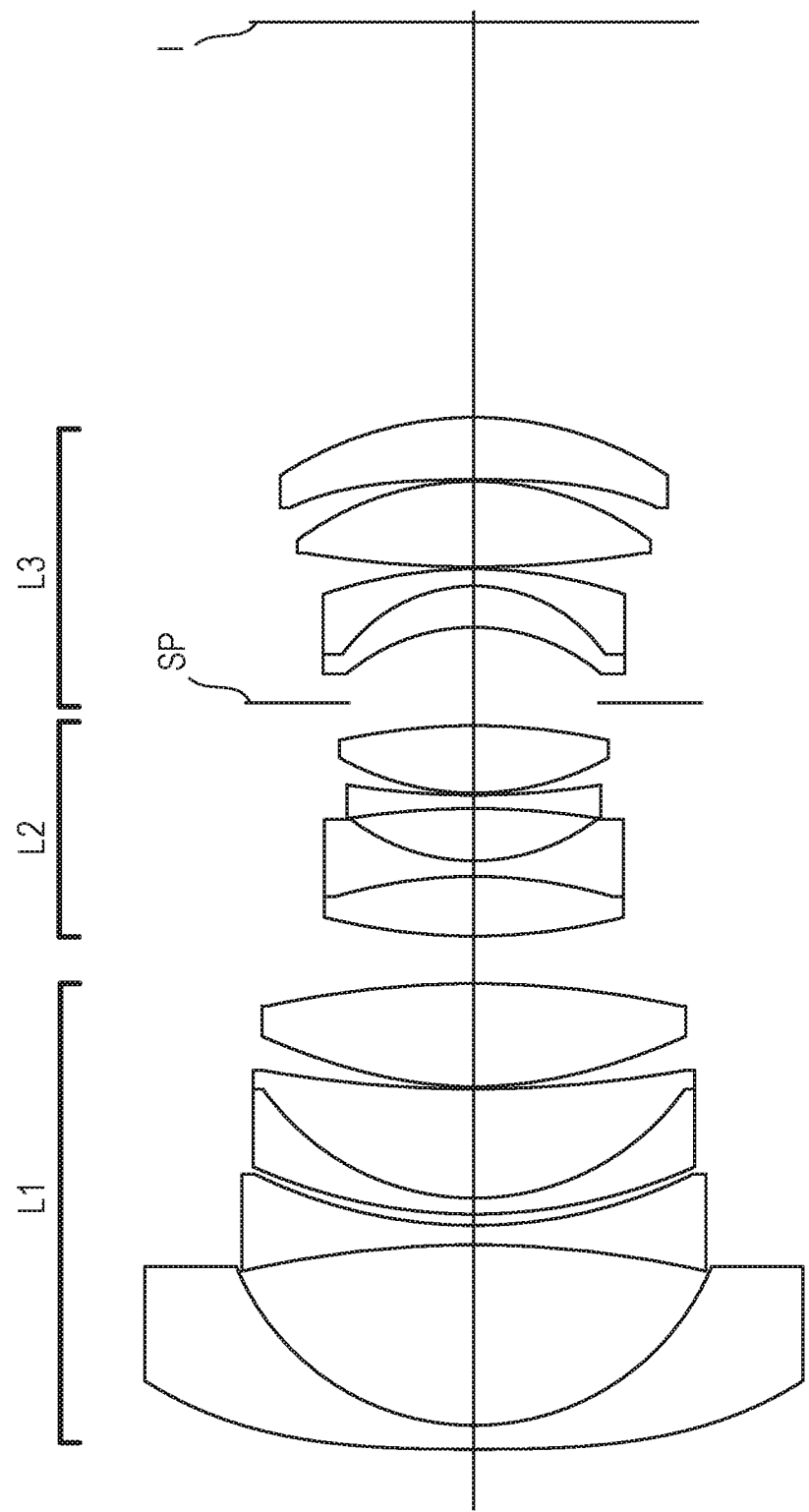

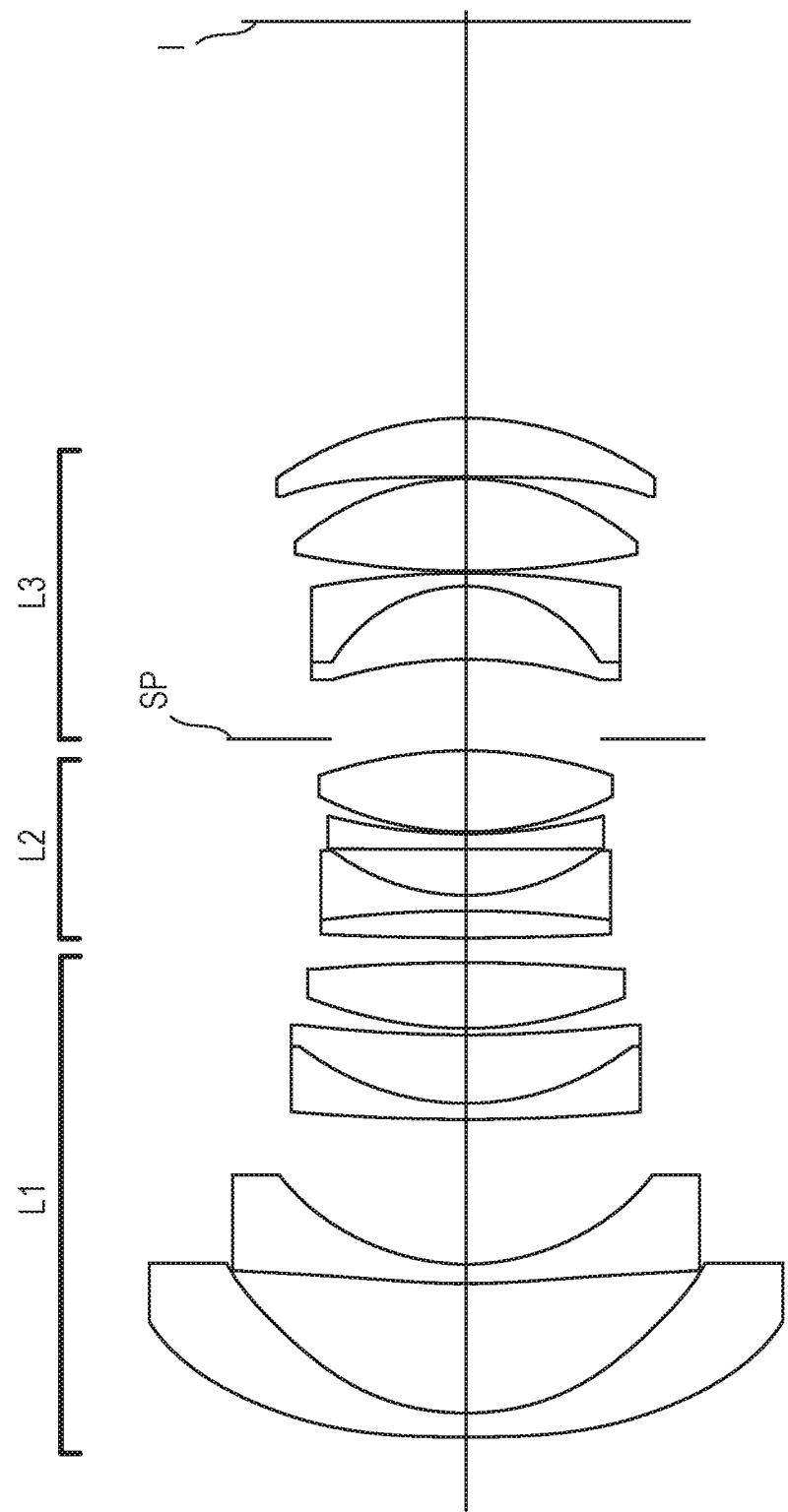

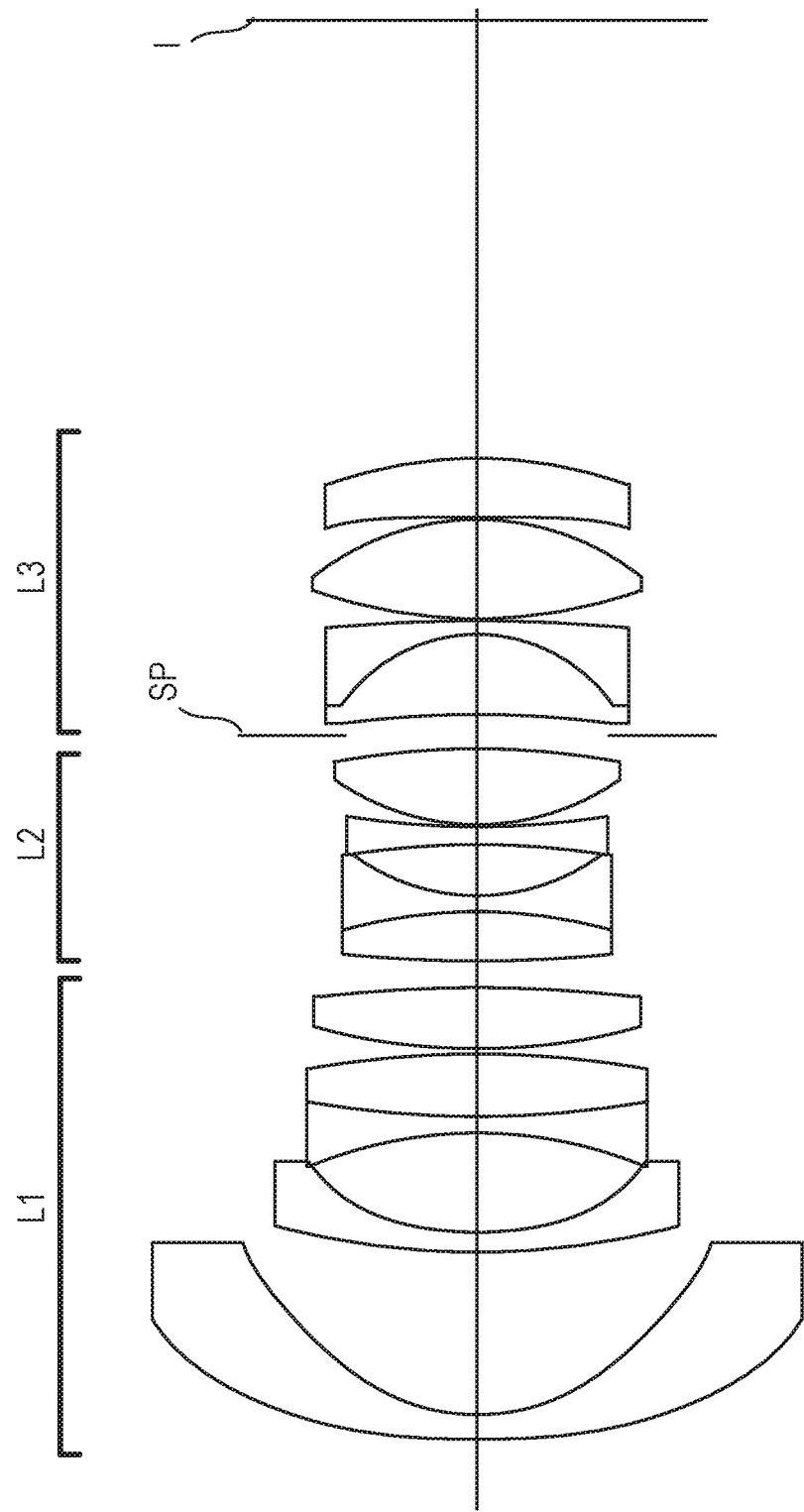

FIXED FOCAL LENGTH LENS AND IMAGE PICKUP APPARATUS

BACKGROUND OF THE INVENTION

Field of the Invention

The present invention relates to a fixed focal length lens and an image pickup apparatus.

Description of the Related Art

Among image pickup apparatuses such as photographic cameras, movie cameras and video cameras, there is a need, in particular, for image pickup optical systems that have a wide angle of view which are used in single-lens reflex cameras or movie cameras to have a long back focus and to also have a substantially uniform resolving power from the center of the image plane to the periphery of the image plane over the entire object distance. Retrofocus-type image pickup optical systems are known as image pickup optical systems that have a wide angle of view and a long back focus. Among these, focus adjustment systems are know that, when adjusting the focus from an object at infinity to a nearby object, use so-called "floating" that causes two units at the rear in the optical system to move to the object side by movement amounts that are different from each other (Japanese Patent Application Laid-Open No. 2016-180851 and Japanese Patent Application Laid-Open No. 2017-15941).

When the aforementioned focus adjustment system that uses floating is adopted, suppression of aberrational changes can be performed. However, unless the power of each unit is appropriately set, it is not possible to compatibly realize both a substantially uniform resolving power from the center of the image plane to the periphery of the image plane and a small and lightweight structure.

SUMMARY OF THE INVENTION

The present invention provides, for example, a fixed focal length lens advantageous in high optical performance over an entire object distance range, and small size and weight.

A fixed focal length lens of the present invention includes, in order from an object side to an image side, a first lens unit having a positive refractive power, a second lens unit having a positive refractive power and a third lens unit having a positive refractive power, the second lens unit and the third lens unit moving for focusing differently from each other to change a distance between each pair of adjacent lens units changes, in which the first lens unit includes, in order from the object side to the image side, a first lens having a negative refractive power and a second lens having a negative refractive power, and conditional expressions:

$$3.3 < f1/f < 12.8, \text{ and}$$

$$0.0 < f3/f2 < 0.5$$

are satisfied where f represents a focal length of the fixed focal length lens in a case of focusing on an object at infinity, f1 represents a focal length of the first lens unit, f2 represents a focal length of the second lens unit and f3 represents a focal length of the third lens unit.

Further features of the present invention will become apparent from the following description of exemplary embodiments with reference to the attached drawings.

BRIEF DESCRIPTION OF THE DRAWINGS

FIG. 1 is a cross-sectional view of lenses when focused at infinity in Numerical Embodiment 1.

FIG. 3 is a cross-sectional view of lenses when focused at infinity in Numerical Embodiment 2.

FIG. 11 is a cross-sectional view of lenses when focused at infinity in Numerical Embodiment 6.

DESCRIPTION OF THE EMBODIMENTS

Figure 2A:
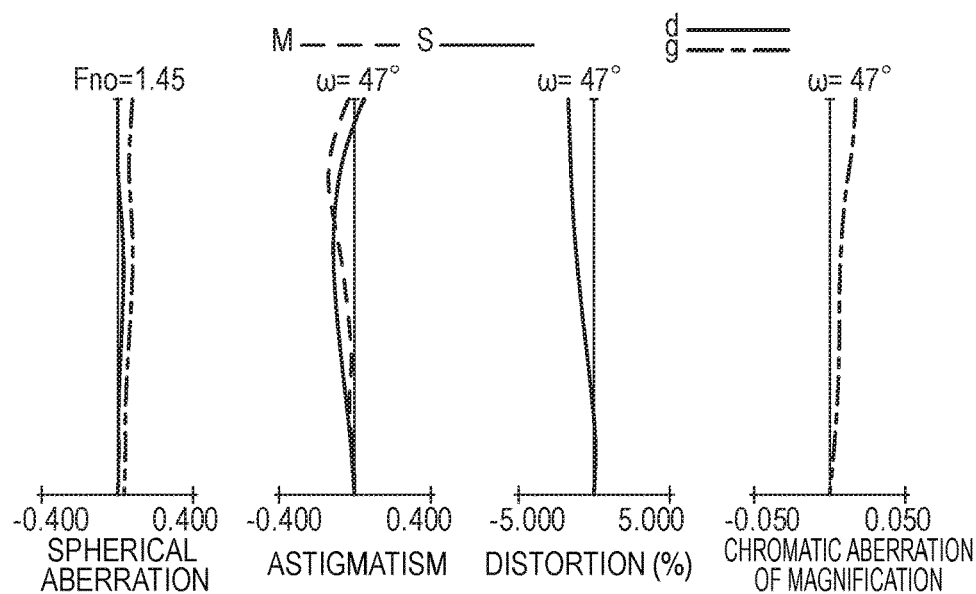
FIG. 2A illustrates longitudinal aberration graphs when focused on an object at an object distance of infinity in Numerical Embodiment 1.

Preferred embodiments of the present invention will now be described in detail in accordance with the accompanying drawings.

First, features of the fixed focal length lens of the present invention will be described in parallel with respective conditional expressions.

To achieve a wide angle of view, a small and lightweight structure, and high optical performance over the entire focusing range, a feature of the present invention is that the present invention defines a focal length ratio between a first lens unit and the entire system, and a focal length ratio between a third lens unit and a second lens unit.

Specifically, a fixed focal length lens and an image pickup apparatus having the fixed focal length lens of the present invention include, in order from the object side, a positive first lens unit, a positive second lens unit and a positive third lens unit, in which a distance between adjacent lens units changes when focusing, and the second lens unit and the third lens unit each move independently for focusing, with the first lens unit including, in order from the object side to the image side, a first lens having a negative refractive power and a second lens having a negative refractive power, wherein following conditional expressions:

$$3.3 < f1/f < 12.8 \quad (1)$$

$$0.0 < f3/f2 < 0.5 \quad (2)$$

are satisfied where f represents a focal length of the entire system, f1 represents a focal length of the first lens unit, f2 represents a focal length of the second lens unit and f3 represents a focal length of the third lens unit.

Optical actions obtained by adopting a configuration including a first lens unit having a positive refractive power that is fixed at a time of focusing, a second lens unit having a positive refractive power and a third lens unit having a positive refractive power that move at a time of focusing according to the present invention will now be described.

By configuring a first lens unit L1 as a lens unit that has a positive refractive power, a light flux that is incident onto a second lens unit L2 is formed into convergent light and an increase in the diameter of the second lens unit L2 and a third lens unit L3 is suppressed. Further, by configuring the second lens unit L2 as a lens unit that has a positive refractive power, an increase in the size of the third lens unit L3 that is disposed on the image side relative to the second lens unit L2 is suppressed. In particular, in a case where an aperture stop is disposed on the image side relative to the second lens unit, an increase in the size of the aperture stop is suppressed and a reduction in the size and weight of the lens is achieved. In addition, by the second lens unit L2 and the third lens unit L3 moving by different movement amounts from each other to the object side along the optical axis when shifting focus to a nearby object from an object at infinity, fluctuations in spherical aberration and curvature of field are suppressed.

In addition, by satisfying the aforementioned expressions (1) and (2), it is possible to effectively achieve a wide angle of view, a small and lightweight structure, and high optical performance over the entire focusing range.

Expression (1) defines a ratio between the focal length f1 of the first lens unit L1 and the focal length f of the entire system. By satisfying expression (1), enlargement of the diameter of the lens closest to the object side in the first lens unit L1 can be suppressed and high optical performance can be efficiently achieved. If the upper limit of expression (1) is not satisfied, the refractive power of the first lens unit L1 is weak, and consequently the incident height of off-axial rays is high in the first lens unit L1 and the diameter of the lens closest to the object side in the first lens unit L1 increases in size. If the lower limit of expression (1) is not satisfied, the composite lateral magnification or combined lateral magnification of the second lens unit L2 and the third lens unit L3 is too large. Consequently, the magnification ratio of the first lens unit L1 becomes too large, and aberration that occurs in the first lens unit L1 is greatly expanded and it becomes difficult to perform adequate aberration correction.

More preferably, expression (1) is set as follows:

$$3.4 < f1/f < 11.2 \quad (1a)$$

Expression (2) defines a ratio between the focal length f3 of the third lens unit L3 and the focal length f2 of the second lens unit L2. By satisfying expression (2), a reduction in size and weight as well as high optical performance is efficiently achieved. If the upper limit of expression (2) is not satisfied, the refractive power of the second lens unit L2 is too strong, and the height of axial rays of the third lens unit is low. Therefore, in the third lens unit, the ability to correct spherical aberration and comatic aberration decreases to deteriorate the optical performance. If the lower limit of expression (2) is not satisfied, the height of axial rays of the third lens unit L3 which is disposed on the image side relative to the second lens unit L2 becomes too high, and the size of the third lens unit increases. In particular, when an aperture stop is disposed on the image side relative to the second lens unit L2, the size of the aperture stop increases.

More preferably, expression (2) is set as follows:

$$0.03 < f3/f2 < 0.45 \quad (2a)$$

As a further aspect of the fixed focal length lens of the present invention, the configuration of the first lens unit L1 is defined. It is defined that the first lens unit L1 includes, in order from the object side to the image side, a negative first lens and a negative second lens. By this means it is possible to widen the angle of the lens while suppressing an increase in the diameter of the lens closest to the object side in the first lens unit L1.

As a further aspect of the fixed focal length lens of the present invention, a ratio between the focal length f of the entire system when focused at infinity and a total length of the lens TD in the optical axis direction when focused at infinity is defined as follows:

$$0.1 < f/TD < 0.3 \quad (3)$$

In order to shorten the total length of the lens TD to a length exceeding the lower limit value of conditional expression (3), it is necessary to strengthen the refractive power of each lens surface. If the refractive power of each lens surface is strengthened, many aberrations will occur and will cause a decline in the optical performance of the optical system. For this reason it is not desirable to strengthen the refractive power of each lens surface. Further, if the total length of the lens TD increases to a length that exceeds the upper limit value of conditional expression (3), it leads to an increase in the size of the entire optical system, which is not desirable.

More preferably, expression (3) is set as follows:

$$0.15 < f/TD < 0.25 \quad (3a)$$

As a further aspect of the fixed focal length lens of the present invention, a ratio between a total length LB1 of the first lens unit L1 and the focal length f of the entire system when focused at infinity is defined as follows:

$$1.5 < LB1/f < 4.0 \quad (4)$$

If the lower limit value of conditional expression (4) is exceeded, the total length of the first lens unit L1 will be too short and aberration correction at the first lens unit L1 at which the height of off-axial rays is highest will be inadequate, and this is not desirable. Further, if the total length of the first lens unit L1 is lengthened to a length exceeding the upper limit value of conditional expression (4), it will lead to an increase in the size of the optical system, and this is not desirable.

More preferably, expression (4) is set as follows:

$$2.0 < LB1/f < 3.5 \quad (4a)$$

As a further aspect of the fixed focal length lens of the present invention, the ratio between a movement amount m2 of the second lens unit L2 and a movement amount m3 of the third lens unit L3 when shifting focus from infinity to a closest object is defined as follows:

$$0.4 < |m2|/|m3| < 1.0 \quad (5)$$

By satisfying expression (5), a reduction in size and weight as well as high optical performance can be efficiently achieved. If the upper limit of expression (5) is not satisfied, the movement amount m2 of the second lens unit L2 becomes too large and it becomes necessary to secure a distance between the first lens unit L1 and the second lens unit L2. Consequently, the total length of the lens will be lengthened, and this is not desirable. If the lower limit of expression (5) is not satisfied, the movement amount m2 of the second lens unit L2 will be too small, and it is not possible to adequately correct fluctuations in spherical aberration and curvature of field when focusing, and this is not desirable.

More preferably, expression (5) is set as follows:

$$0.5 < |m2|/|m3| < 0.95 \quad (5a)$$

As a further aspect of the fixed focal length lens of the present invention, the configuration of the first lens unit L1 is defined. It is defined that the first lens unit L1 includes two or more aspherical surfaces. By disposing aspherical surfaces in the first lens unit, distortion and astigmatism can be effectively corrected. By this means, it is possible to reduce the number of lenses included in the first lens unit, suppress the total length of the lens, and suppress an increase in the diameter and widen the angle of the lens.

In addition, an image pickup apparatus of the present invention is characterized by including a fixed focal length lens of the respective embodiments, and a solid-state image pickup element having a predetermined effective image pickup range that receives an optical image formed by the fixed focal length lens.

Hereunder, specific configurations of the fixed focal length lens of the present invention are described by way of the features of lens configurations of Numerical Embodiments 1 to 7 that correspond to Embodiments 1 to 7.

Embodiment 1

Figure 2B:
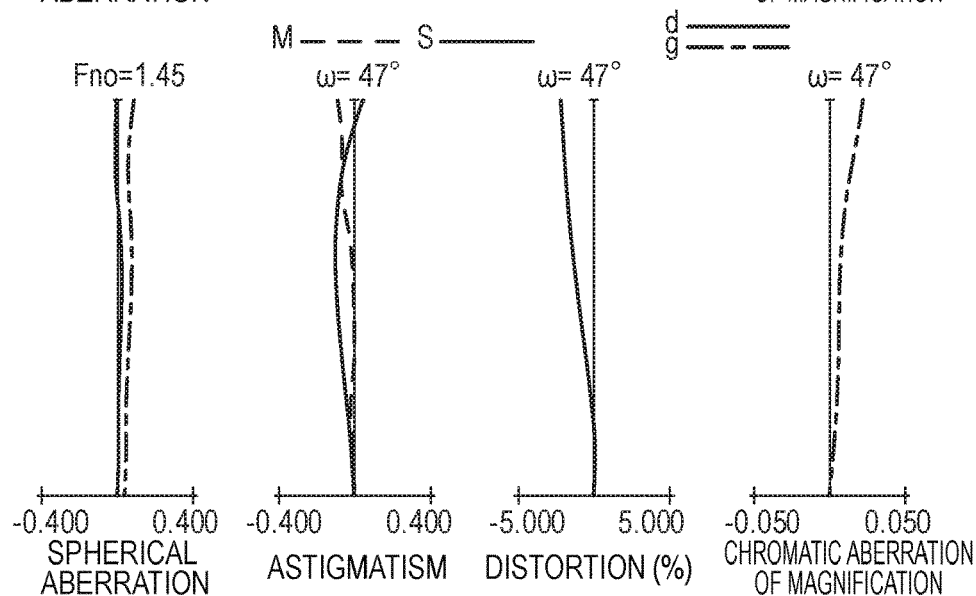
FIG. 2B illustrates longitudinal aberration graphs when focused on an object at an object distance of 1.0 m in Numerical Embodiment 1.
Figure 2C:
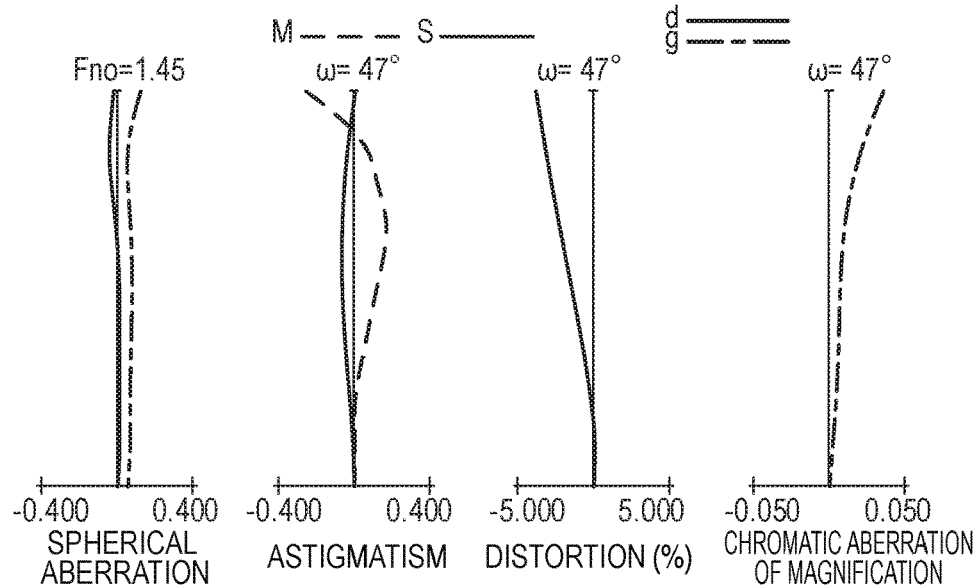
FIG. 2C illustrates longitudinal aberration graphs when focused on an object at an object distance of 0.3 m in Numerical Embodiment 1.

FIG. 1 is a cross-sectional view of lenses when focused at infinity in a fixed focal length lens that is Embodiment 1 (Numerical Embodiment 1) of the present invention. FIGS. 2A, 2B and 2C illustrate longitudinal aberration graphs when focused on an object at infinity, 1.0 m and 0.3 m, respectively. The values of the focal lengths are values when a numerical embodiment that is described later is expressed in mm units. The same also applies with respect to the numerical embodiments described hereunder.

In FIG. 1, the fixed focal length lens has, in order from an object side to an image side, a first lens unit L1 having a positive refractive power that does not move for focusing, and furthermore, a second lens unit L2 having a positive refractive power that moves to the object side when shifting focus to a nearby object from infinity, and a third lens unit L3 having a positive refractive power that, when shifting focus to a nearby object from infinity, moves to the object side by a movement amount that is different from a movement amount of the second lens unit L2. Reference characters SP denote an aperture stop. Reference character I denotes an image plane that, when using the fixed focal length lens as an image pickup optical system of a broadcast video camera, a video camera or a digital still camera, corresponds to an image pickup surface of a solid-state image pickup element (photoelectric conversion element) or the like that receives an optical image formed by the fixed focal length lens and performs photoelectric conversion thereof. When using the fixed focal length lens as an image pickup optical system of a film camera, the image plane I corresponds to a film surface that an image formed by the fixed focal length lens exposes to light.

In the longitudinal aberration graphs, a straight line and a broken line in the graphs illustrating spherical aberrations represent a d line and a g line, respectively. A broken line and a solid line in the graphs illustrating astigmatisms represent a meridional image plane and a sagittal image plane, respectively. A chain line in the graphs illustrating chromatic aberrations of magnification represents a g line. Further, (I) represents a half angle of view, and Fno represents an F number. In the longitudinal aberration graphs, the spherical aberrations are shown in a scale of 0.4 mm, the astigmatisms are shown in a scale of 0.4 mm, the distortions are shown in a scale of 5%, and the chromatic aberrations of magnification are shown in a scale of 0.05 mm.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a biconcave lens, a cemented lens consisting of a meniscus concave lens that is convex toward the object side and a meniscus convex lens that is convex toward the object side, and a biconvex lens. Further, a first surface is an aspherical surface, and mainly performs correction of distortion and astigmatism. In addition, an eighth surface is an aspherical surface, and mainly performs correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens and a biconvex lens. The third lens unit L3 corresponds to a seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a meniscus convex lens which is concave toward the object side. Further, a twenty-third surface is an aspherical surface, and mainly performs correction of spherical aberration and astigmatism.

Numerical Embodiment 1 that corresponds to the above Embodiment 1 will now be described. In all of the numerical embodiments and not just Numerical Embodiment 1, reference character "i" represents the order of the surface (optical surface) as counted from the object side, reference characters "ri" represent the radius of curvature of the i-th surface as counted from the object side, and reference characters "di" represents the distance (on the optical axis) between the i-th surface and the i+1-th surface as counted from the object side. Further, reference characters "ndi" and "vdi" represent the refractive index, and Abbe number of a medium (optical member) between the i-th surface and the i+1-th surface, and reference characters "BF" represent an air-converted back focus. An aspherical surface shape is represented by the following formula when the optical axis direction is defined as an X axis, a direction perpendicular to the optical axis is defined as an H axis, a direction in which light travels is defined as positive, R represents the paraxial curvature radius, k represents the conic constant, and A4, A6, A8, A10, A12, A14, A16, A3, A5, A7, A9, A11, A13 and A15 are the aspherical surface coefficients, respectively. Further, "e-Z" means "×10$^{-Z}$".

$$X = \frac{H^2/R}{1 + \sqrt{1 - (1+k)(H/R)^2}} + A4H^4 + A6H^6 + A8H^8 +$$ [Expression 1]
$$A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Table 1 lists the corresponding values for the respective conditional expressions of the present embodiment. The present embodiment satisfies expressions (1) to (5), and achieves an image-taking angle of view (angle of view) of 93.08°. Furthermore, the present embodiment realizes a fixed focal length lens having high optical performance in which aberrations are favorably corrected over the entire focusing range. Although it is essential that the fixed focal length lens of the present invention satisfies expressions (1) and (2), the fixed focal length lens need not satisfy expressions (3) to (5). However, a better effect can be achieved if the fixed focal length lens satisfies at least one of expressions (3) to (5). This similarly applies with respect to the other embodiments also.

Figure 13:
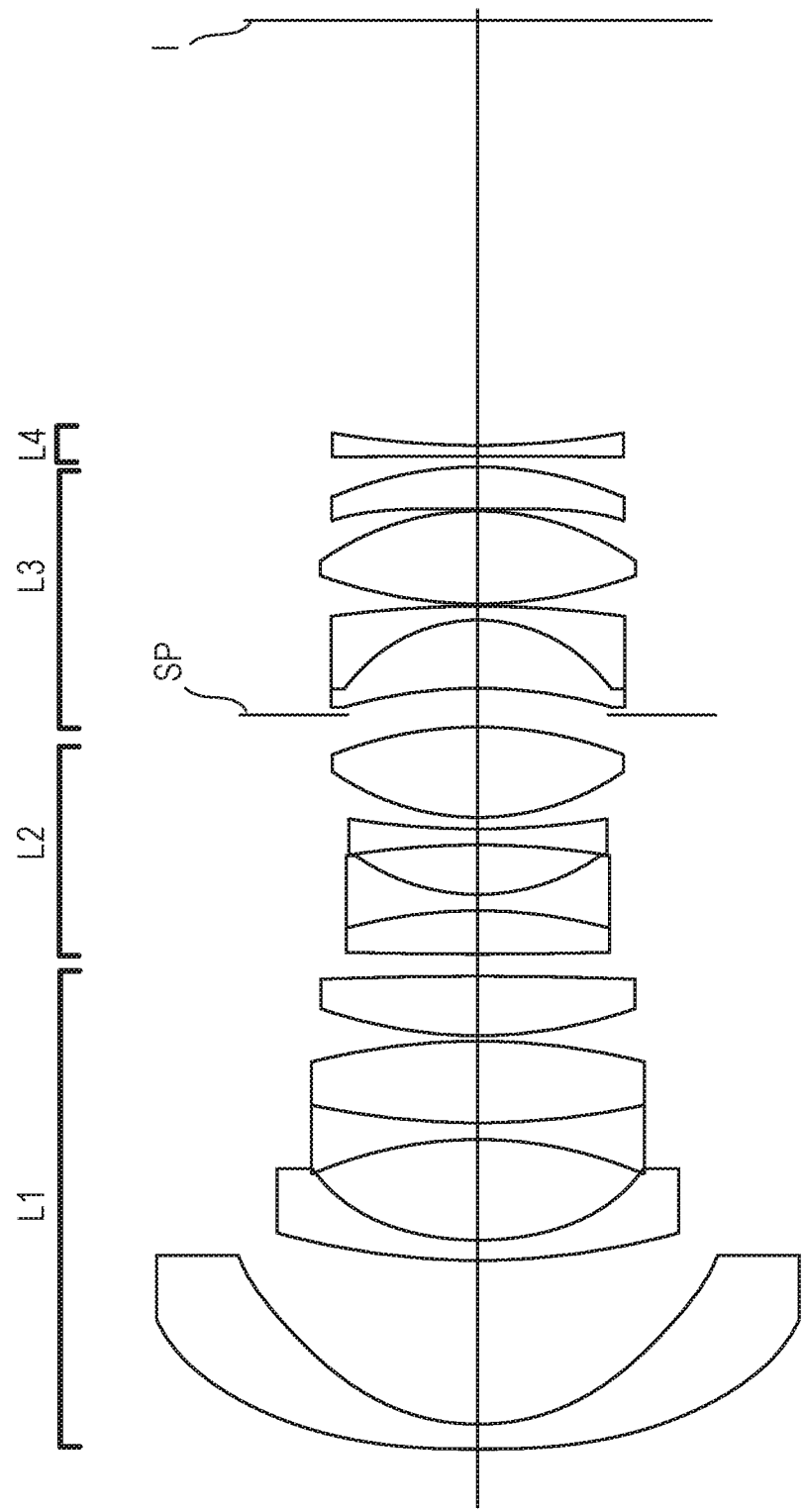
FIG. 13 is a cross-sectional view of lenses when focused at infinity in Numerical Embodiment 7.

FIG. 13 is a schematic view of main portions of a digital still camera. In FIG. 13, a lens apparatus 10 includes an image-taking optical system 1 of the present numerical embodiment. The image-taking optical system 1 is held in a lens barrel 2 that is a holding member. Reference numeral 20 denotes a camera body. The camera body 20 includes a quick return mirror 3, a focusing glass 4, a pentaprism 5, an eyepiece 6, and the like. The quick return mirror 3 reflects a light flux from the image-taking optical system 1 upward. The focusing glass 4 is disposed at an image formation position in the image-taking optical system 1. The pentaprism 5 converts an inverted image or a reversed image formed on the focusing glass 4 into an erected image. An observer observes the erected image through the eyepiece 6. Reference numeral 7 denotes a photosensitive surface on which a solid-state image pickup element (a photoelectric conversion element) such as a CCD sensor or a CMOS sensor, a silver halide film, or the like is disposed to receive the image. When taking an image, the quick return mirror 3 recedes from the optical path, and the image-taking optical system 1 forms the image on the photosensitive surface 7. Note that, the optical system of the present invention can be applied to a broadcast video camera, a movie camera, a video camera, a digital still camera and a silver halide photography camera and the like.

Thus, by applying the fixed focal length lens of the present invention to a single-lens reflex camera, a video camera or a cinema camera, an image pickup apparatus that has high optical performance is realized.

Embodiment 2

Figure 4A:
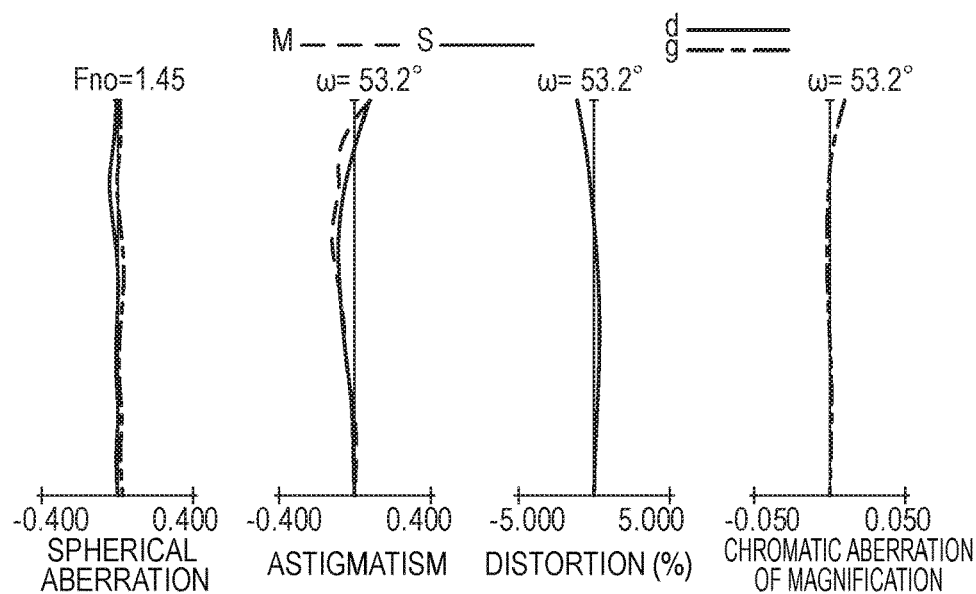
FIG. 4A illustrates longitudinal aberration graphs when focused on an object at an object distance of infinity in Numerical Embodiment 2.
Figure 4B:
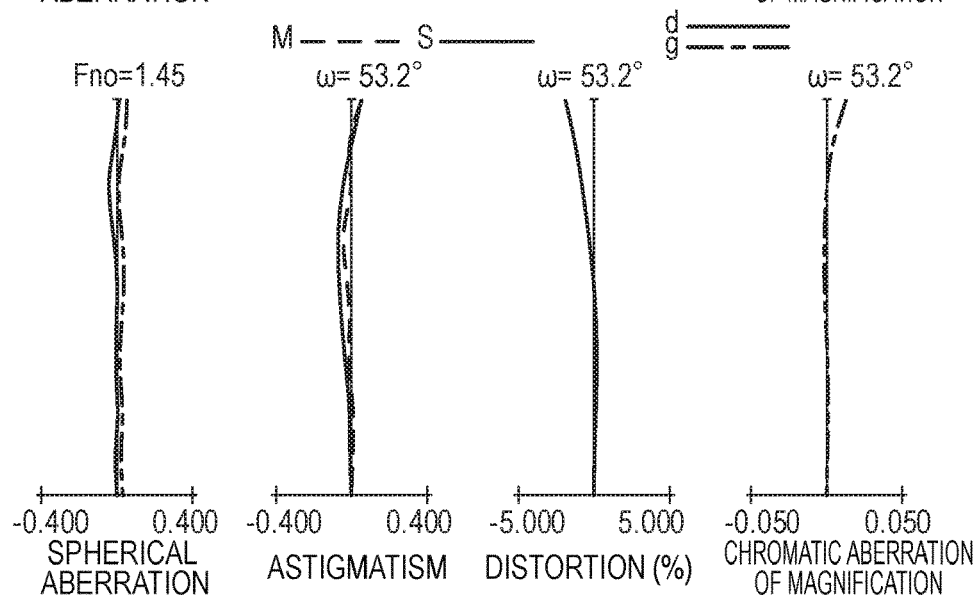
FIG. 4B illustrates longitudinal aberration graphs when focused on an object at an object distance of 1.0 m in Numerical Embodiment 2.
Figure 4C:
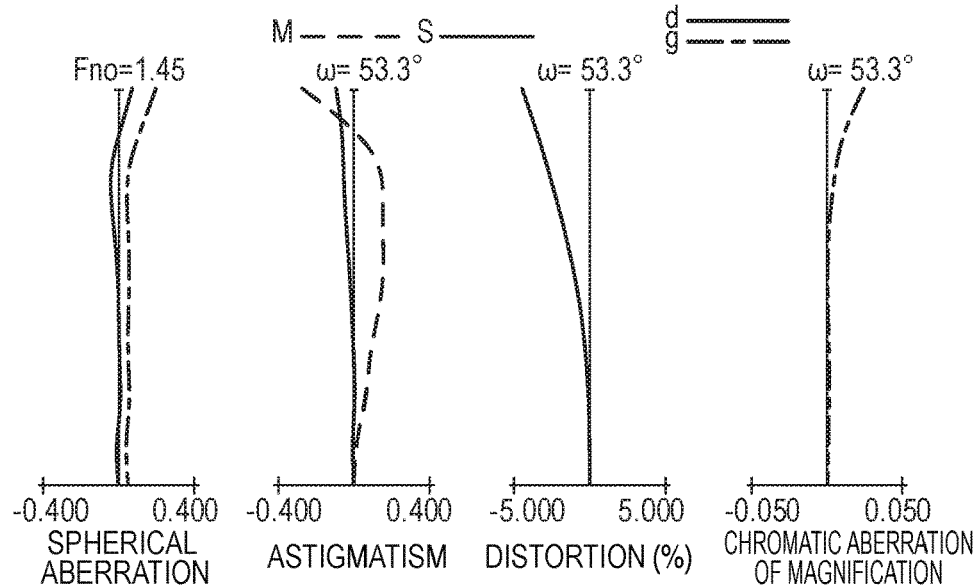
FIG. 4C illustrates longitudinal aberration graphs when focused on an object at an object distance of 0.3 m in Numerical Embodiment 2.

FIG. 3 is a cross-sectional view of lenses when focused at infinity in a fixed focal length lens that is Embodiment 2 (Numerical Embodiment 2) of the present invention. FIGS. 4A, 4B and 4C illustrate longitudinal aberration graphs when focused on an object at infinity, 1.0 m and 0.3 m, respectively.

In FIG. 3, the fixed focal length lens has, in order from an object side to an image side, a first lens unit L1 having a positive refractive power that does not move for focusing, and furthermore, a second lens unit L2 having a positive refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described. The first lens unit L1 corresponds to a first surface to a ninth surface. The first lens unit L1 includes, in order from the object side to the image side, a meniscus concave lens which is convex toward the object side, a meniscus concave lens which is convex toward the object side, a cemented lens consisting of a meniscus concave lens which is convex toward the object side and a meniscus convex lens which is convex toward the object side, and a biconvex lens. Further, the first surface and third surface are aspherical surfaces, and mainly perform correction of distortion and astigmatism. In addition, the second surface and fourth surface are aspherical surfaces, and mainly perform correction of astigmatism. In addition, the eighth surface is an aspherical surface, and performs correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a meniscus concave lens which is convex toward the object side, and a biconvex lens. The third lens unit L3 corresponds to a seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a meniscus convex lens which is concave toward the object side. Further, the twenty-third surface is an aspherical surface, and mainly performs correction of spherical aberration and astigmatism.

Table 1 lists the corresponding values for the respective conditional expressions of the present embodiment. The present embodiment satisfies expressions (1) to (5), and achieves a wider angle of view, with the image-taking angle of view (angle of view) being 105.68°. Furthermore, the present embodiment realizes a fixed focal length lens having high optical performance in which aberrations are favorably corrected over the entire focusing range.

Embodiment 3

Figure 5:
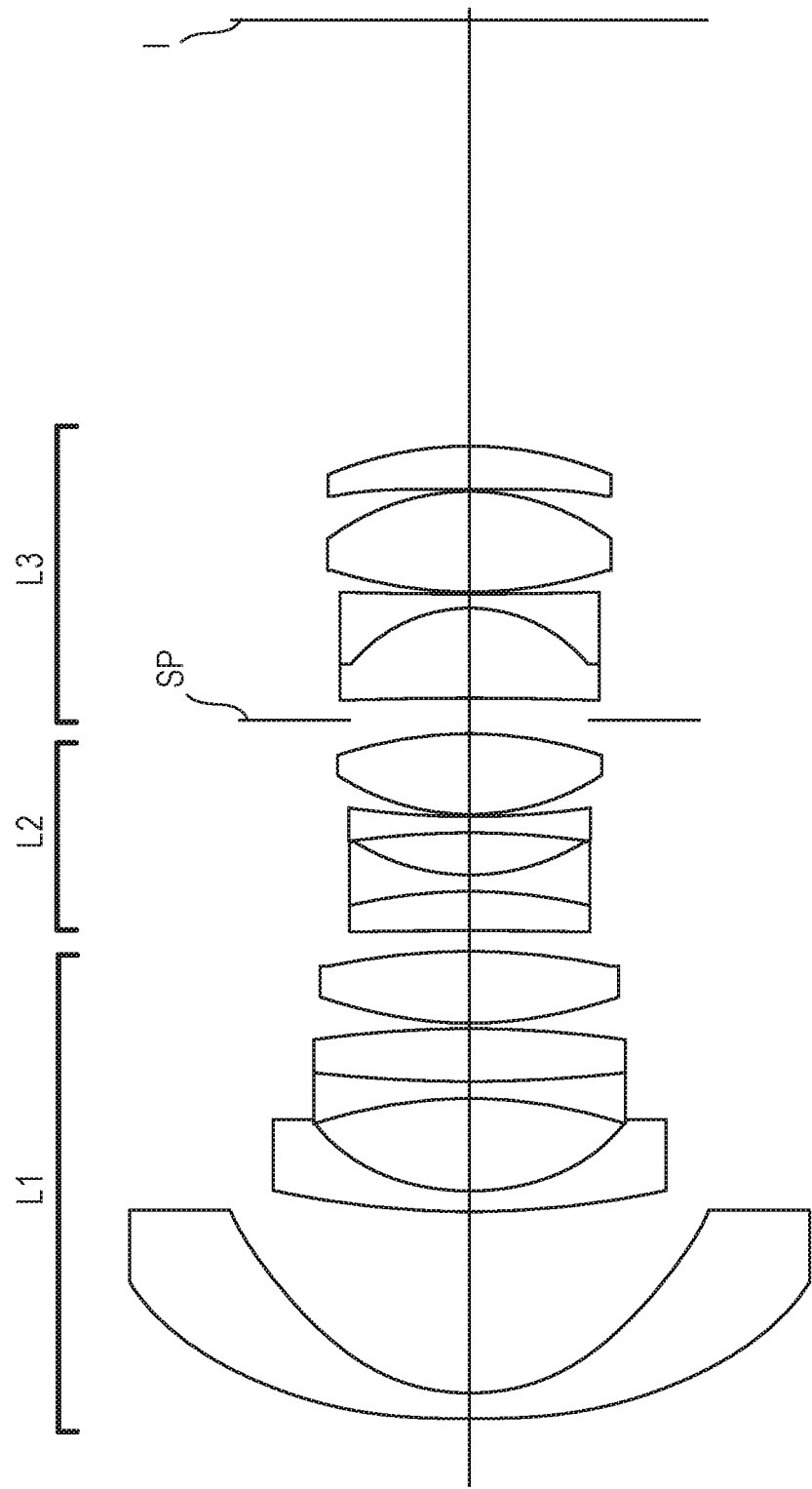
FIG. 5 is a cross-sectional view of lenses when focused at infinity in Numerical Embodiment 3.
Figure 6A:
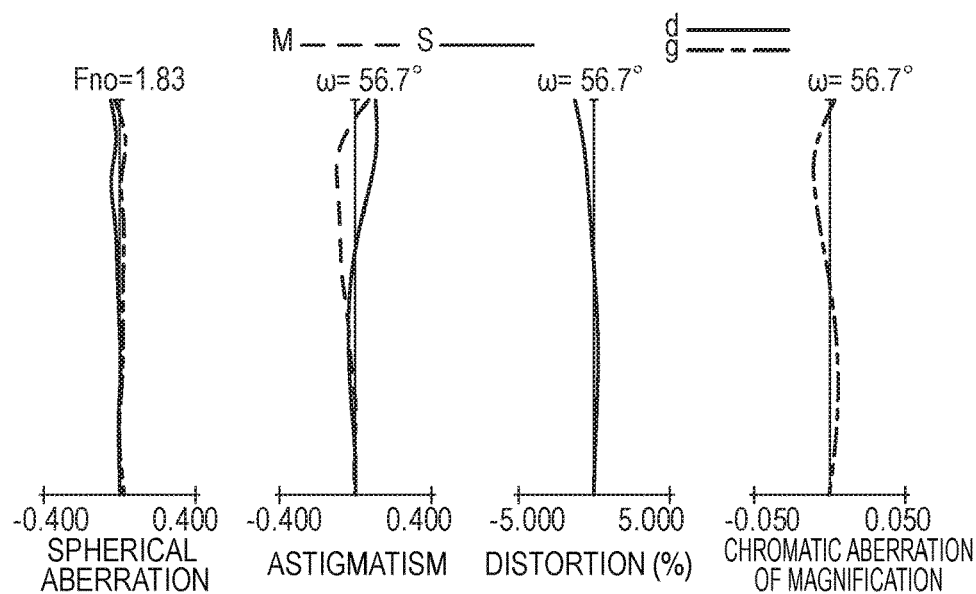
FIG. 6A illustrates longitudinal aberration graphs when focused on an object at an object distance of infinity in Numerical Embodiment 3.
Figure 6B:
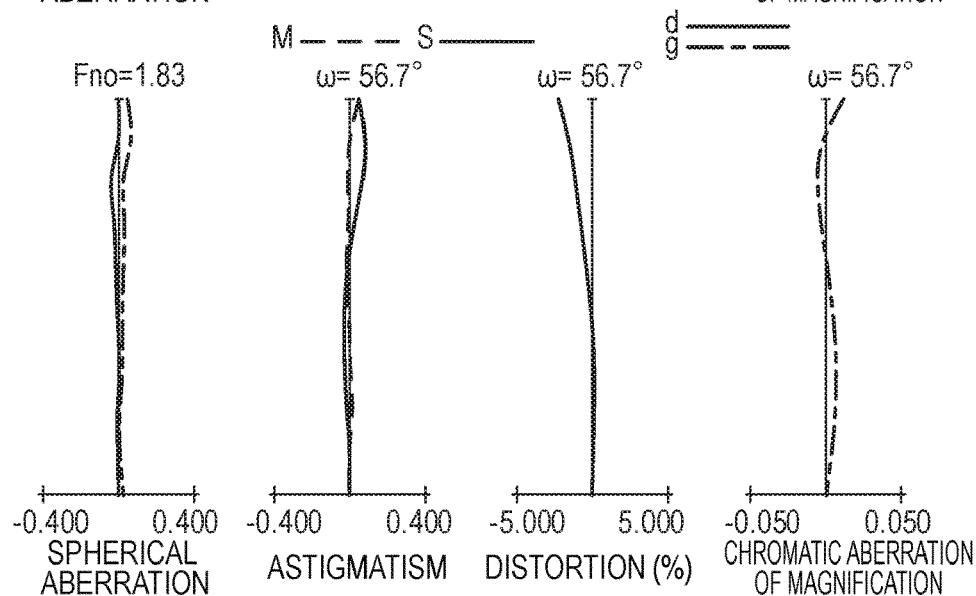
FIG. 6B illustrates longitudinal aberration graphs when focused on an object at an object distance of 1.0 m in Numerical Embodiment 3.
Figure 6C:
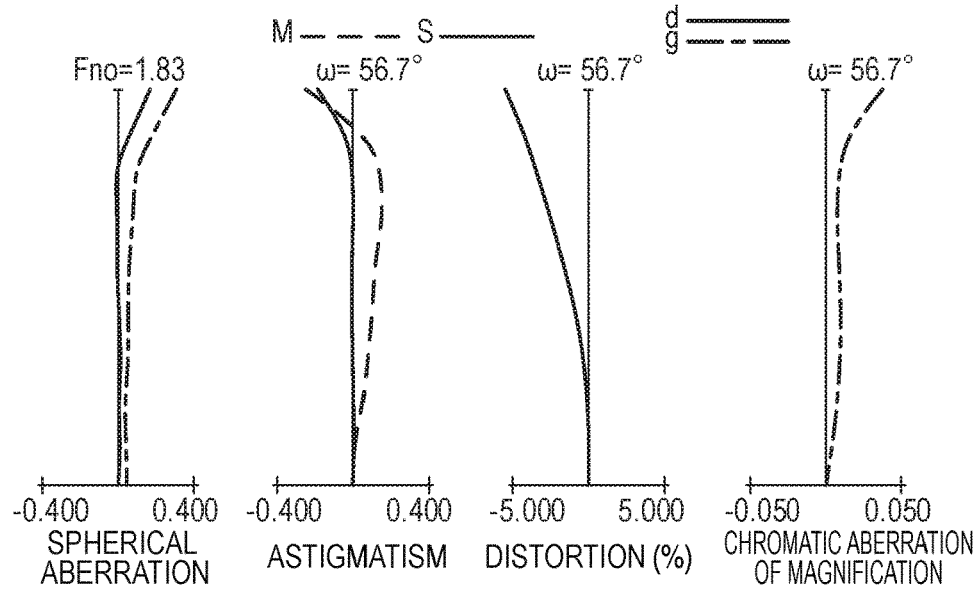
FIG. 6C illustrates longitudinal aberration graphs when focused on an object at an object distance of 0.3 m in Numerical Embodiment 3.

FIG. 5 is a cross-sectional view of lenses when focused at infinity in a fixed focal length lens that is Embodiment 3 (Numerical Embodiment 3) of the present invention. FIGS. 6A, 6B and 6C illustrate longitudinal aberration graphs when focused on an object at infinity, 1.0 m and 0.3 m, respectively.

In FIG. 5, the fixed focal length lens has, in order from an object side to an image side, a first lens unit L1 having a positive refractive power that does not move for focusing, and furthermore, a second lens unit L2 having a positive refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a meniscus concave lens that is convex toward the object side, a cemented lens consisting of a biconcave lens and a biconvex lens, and a biconvex lens. Further, the first surface and the second surface are aspherical surfaces, and mainly perform correction of distortion and astigmatism. In addition, the fourth surface and the eighth surface are aspherical surfaces, and mainly perform correction of spherical aberration. The second lens unit L2 corresponds to a tenth surface to a sixteenth surface. The second lens unit L2 includes, in order from the object side to the image side, a cemented lens consisting of a meniscus convex lens that is concave toward the object side and a biconcave lens, a biconcave lens, and a biconvex lens. The third lens unit L3 corresponds to an seventeenth surface to a twenty-fourth surface. The third lens unit L3 includes, in order from the object side to the image side, an aperture stop SP, a cemented lens consisting of a meniscus convex lens which is concave toward the object side and a biconcave lens, a biconvex lens, and a biconvex lens. Further, the twenty-third surface is an aspherical surface, and mainly performs correction of spherical aberration and astigmatism.

Table 1 lists the corresponding values for the respective conditional expressions of the present embodiment. The present embodiment satisfies expressions (1) to (5), and achieves a wider angle of view, with the image-taking angle of view (angle of view) being 112.70°. Furthermore, the present embodiment realizes a fixed focal length lens having high optical performance in which aberrations are favorably corrected over the entire focusing range.

Embodiment 4

Figure 7:
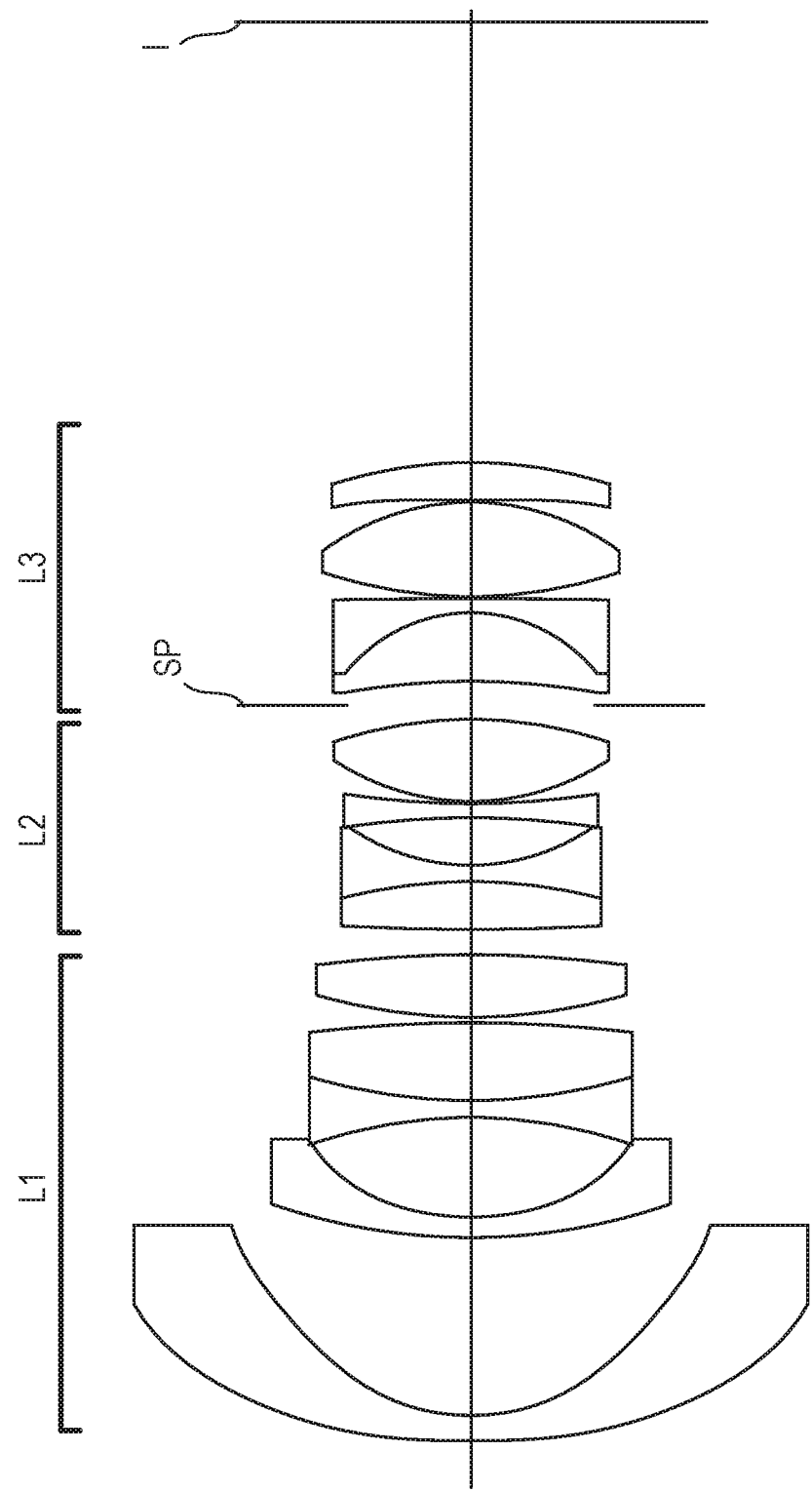
FIG. 7 is a cross-sectional view of lenses when focused at infinity in Numerical Embodiment 4.
Figure 8A:
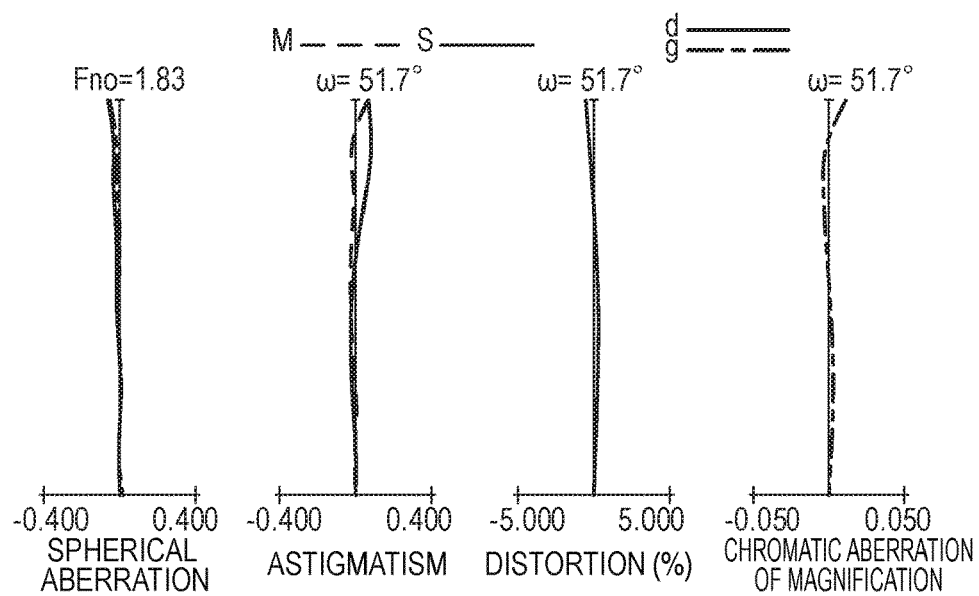
FIG. 8A illustrates longitudinal aberration graphs when focused on an object at an object distance of infinity in Numerical Embodiment 4.
Figure 8B:
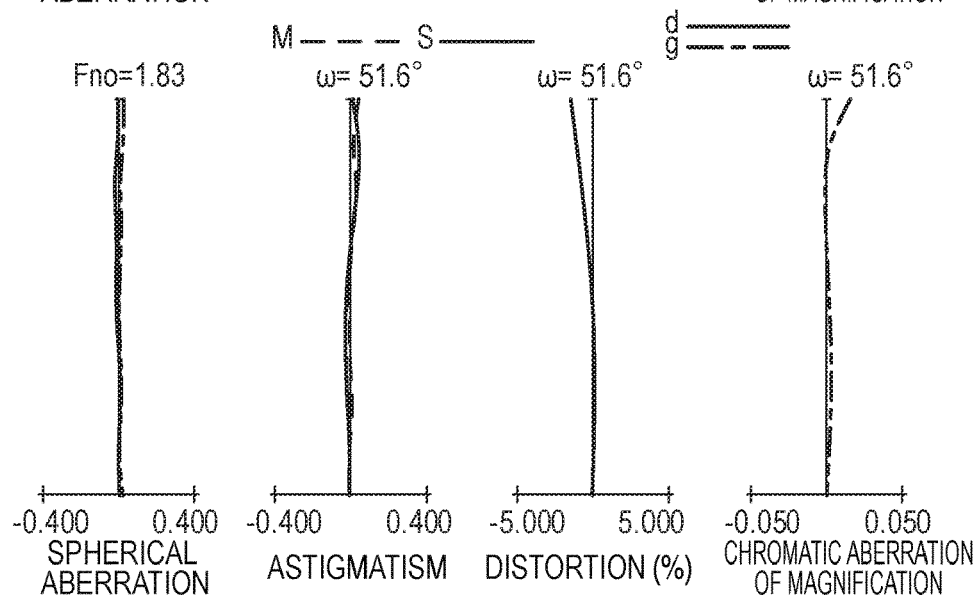
FIG. 8B illustrates longitudinal aberration graphs when focused on an object at an object distance of 1.0 m in Numerical Embodiment 4.
Figure 8C:
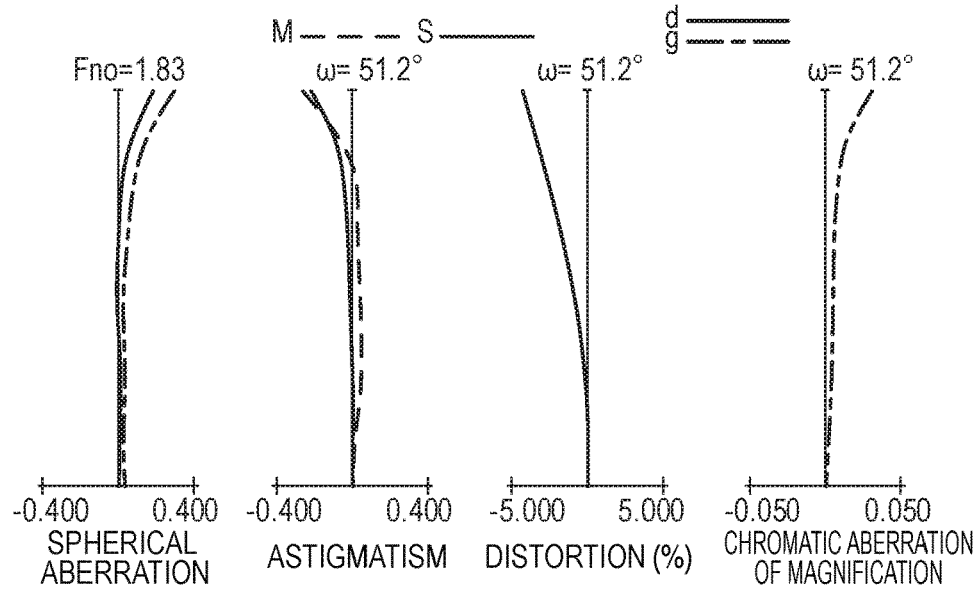
FIG. 8C illustrates longitudinal aberration graphs when focused on an object at an object distance of 0.3 m in Numerical Embodiment 4.

FIG. 7 is a cross-sectional view of lenses when focused at infinity in a fixed focal length lens that is Embodiment 4 (Numerical Embodiment 4) of the present invention. FIGS. 8A, 8B and 8C illustrate longitudinal aberration graphs when focused on an object at infinity, 1.0 m and 0.3 m, respectively.

In FIG. 7, the fixed focal length lens has, in order from an object side to an image side, a first lens unit L1 having a positive refractive power that does not move for focusing, and furthermore, a second lens unit L2 having a positive refractive power that, when focusing on a nearby object from infinity, moves to the object side, and a third lens unit L3 having a positive refractive power that, when focusing on a nearby object from infinity, moves to the object side by a movement amount that is different from a movement amount of the second lens unit L2.

Next, the first lens unit L1 in the present embodiment will be described. The first lens unit L1 corresponds to a first surface to a ninth surface. The first lens unit L1 includes, in order from the object side to the image side, a meniscus concave lens that is convex toward the object side, a meniscus concave lens that is convex toward the object side, a cemented lens consisting of a biconcave lens and a biconvex lens, and a biconvex lens. The first surface and the second surface are aspherical surfaces, and mainly perform correction of distortion and astigmatism. In addition, the fourth surface and eighth surface are aspherical surfaces, and mainly perform correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to a seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a biconvex lens. Further, the twenty-third surface is an aspherical surface, and mainly performs correction of spherical aberration and astigmatism.

Table 1 lists the corresponding values for the respective conditional expressions of the present embodiment. The present embodiment satisfies expressions (1) to (5) and achieves a wider angle of view, with the image-taking angle of view (angle of view) being 103.16°. Furthermore, the present embodiment realizes a fixed focal length lens having high optical performance in which aberrations are favorably corrected over the entire focusing range.

Embodiment 5

Figure 9:
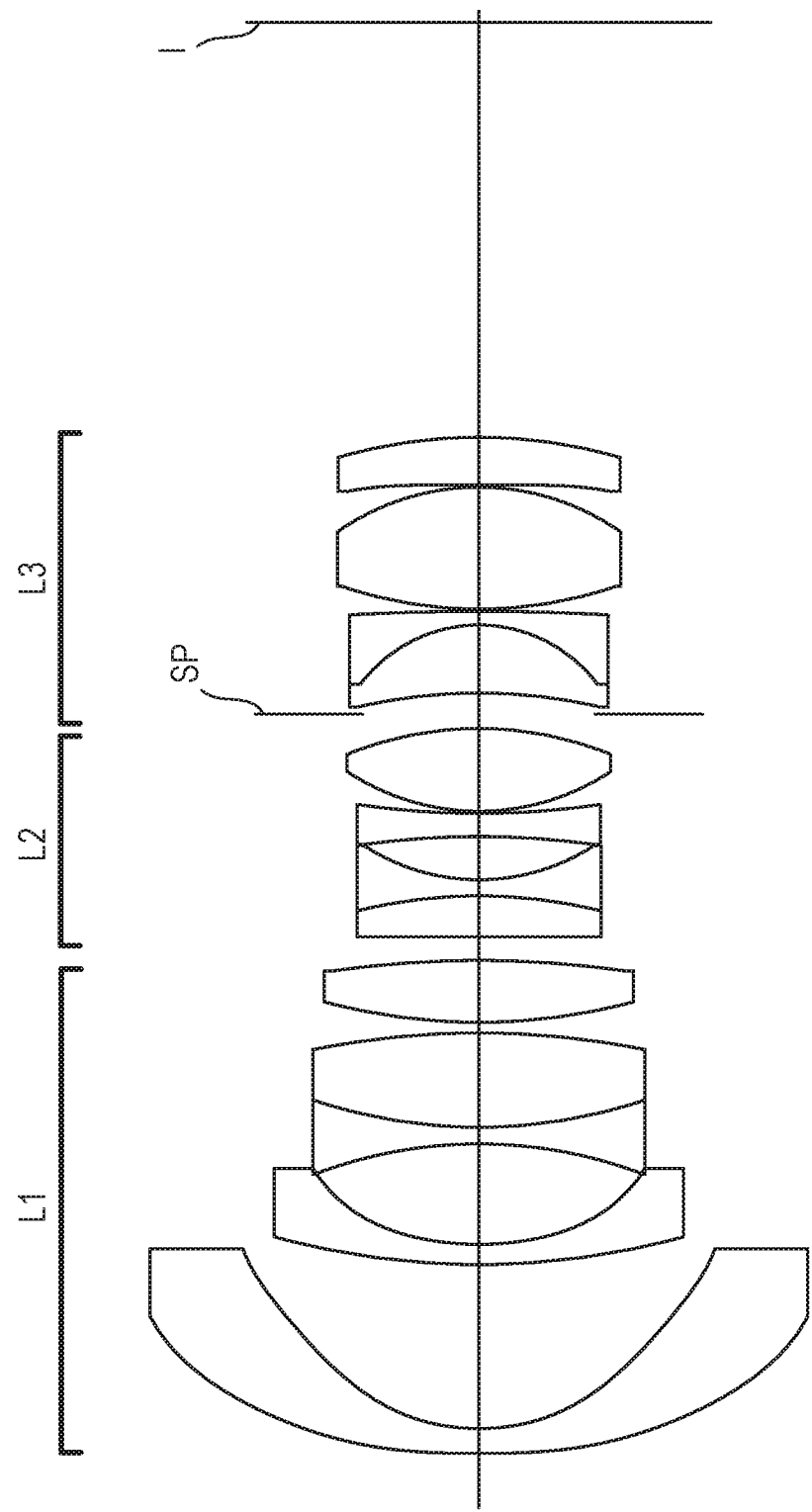
FIG. 9 is a cross-sectional view of lenses when focused at infinity in Numerical Embodiment 5.
Figure 10A:
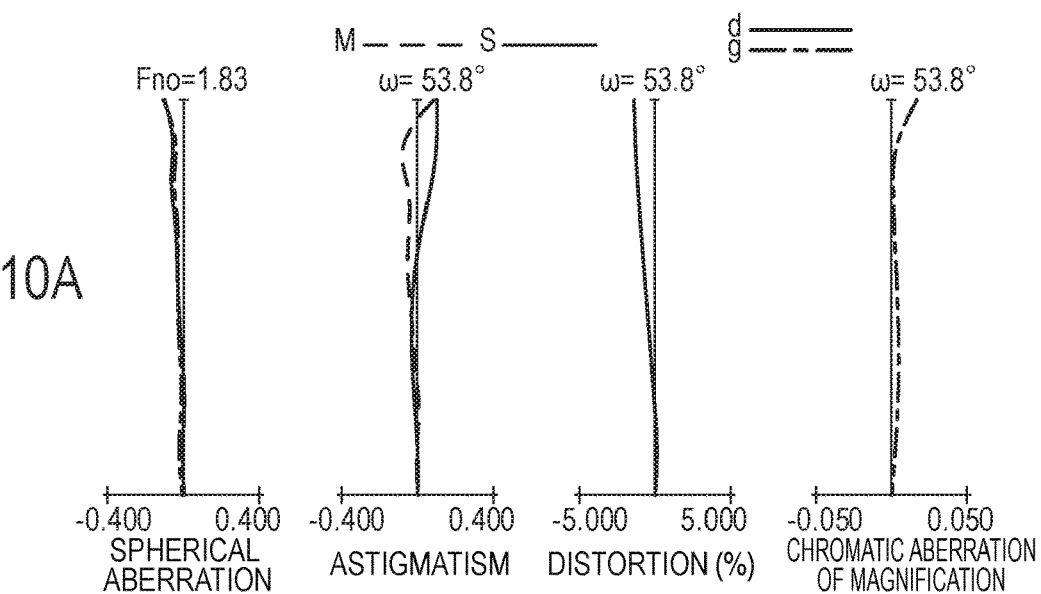
FIG. 10A illustrates longitudinal aberration graphs when focused on an object at an object distance of infinity in Numerical Embodiment 5.
Figure 10B:
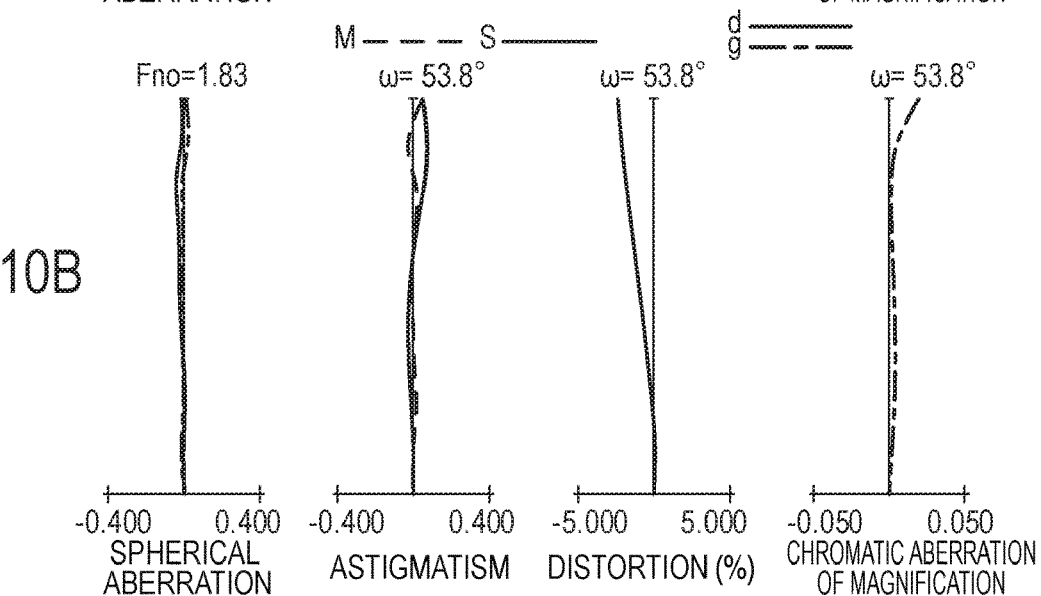
FIG. 10B illustrates longitudinal aberration graphs when focused on an object at an object distance of 1.0 m in Numerical Embodiment 5.
Figure 10C:
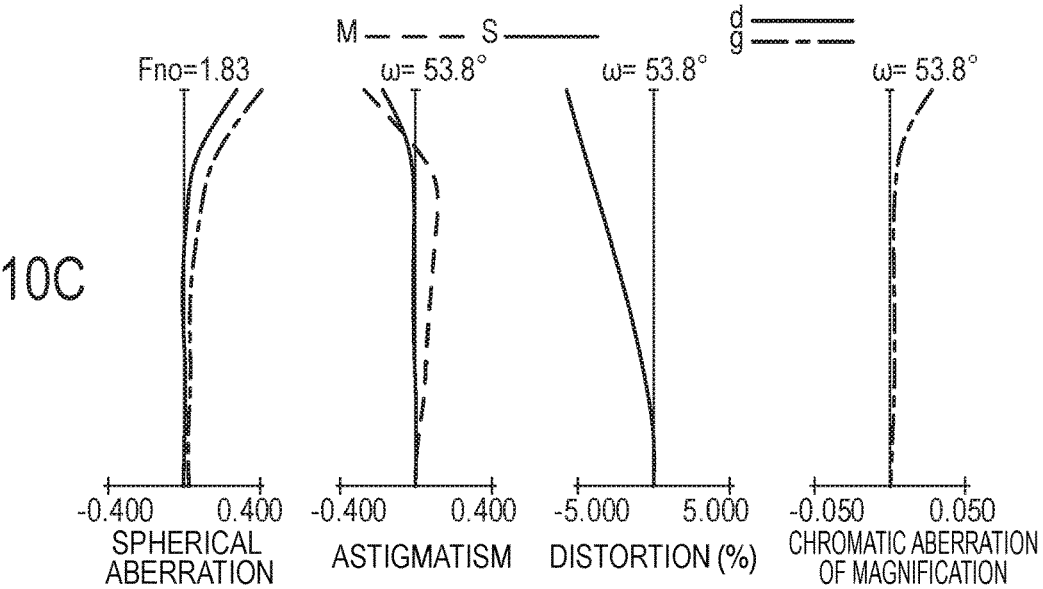
FIG. 10C illustrates longitudinal aberration graphs when focused on an object at an object distance of 0.3 m in Numerical Embodiment 5.

FIG. 9 is a cross-sectional view of lenses when focused at infinity in a fixed focal length lens that is Embodiment 5 (Numerical Embodiment 5) of the present invention. FIGS. 10A, 10B and 10C illustrate longitudinal aberration graphs when focused on an object at infinity, 1.0 m and 0.3 m, respectively.

In FIG. 9, the fixed focal length lens has, in order from an object side to an image side, a first lens unit L1 having a positive refractive power that does not move for focusing, and furthermore, a second lens unit L2 having a positive refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described. The first lens unit L1 corresponds to a first surface to a ninth surface. The first lens unit L1 includes, in order form the object side to the image side, a meniscus concave lens which is convex toward the object side, a meniscus concave lens which is convex toward the object side, a cemented lens consisting of a biconcave lens and a biconvex lens, and a biconvex lens. The first surface and the second surface are aspherical surfaces, and mainly perform correction of distortion and astigmatism. In addition, the fourth surface and the eighth surface are aspherical surfaces, and mainly perform correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to a seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a biconvex lens. Further, the twenty-third surface is an aspherical surface, and mainly performs correction of spherical aberration and astigmatism.

Table 1 lists the corresponding values for the respective conditional expressions of the present embodiment. The present embodiment satisfies expressions (1) to (5) and achieves a wider angle of view, with the image-taking angle of view (angle of view) being 106.90°. Furthermore, the present embodiment realizes a fixed focal length lens having high optical performance in which aberrations are favorably corrected over the entire focusing range.

Embodiment 6

Figure 12A:
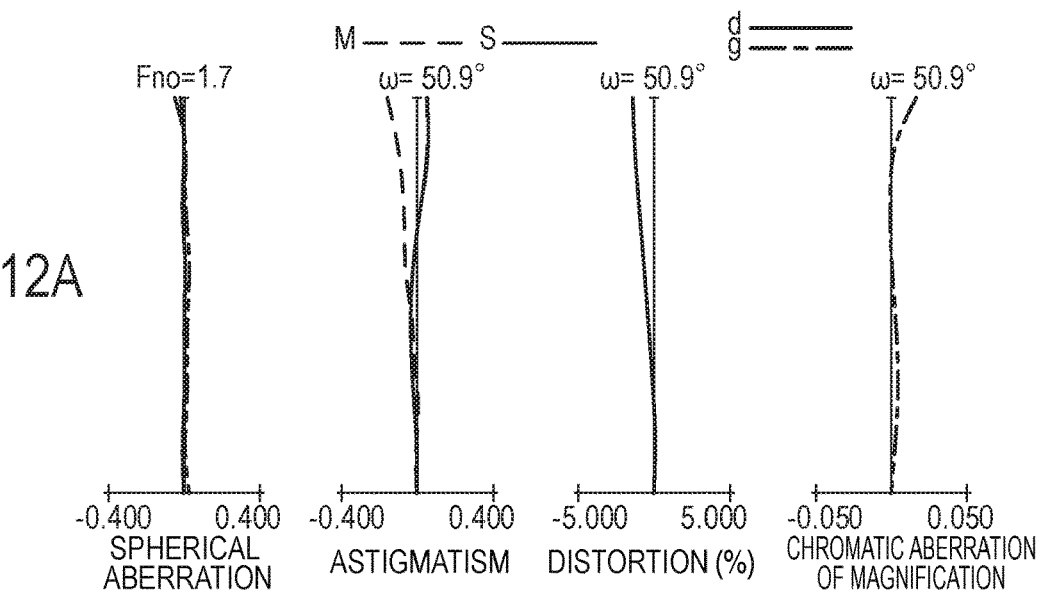
FIG. 12A illustrates longitudinal aberration graphs when focused on an object at an object distance of infinity in Numerical Embodiment 6.
Figure 12B:
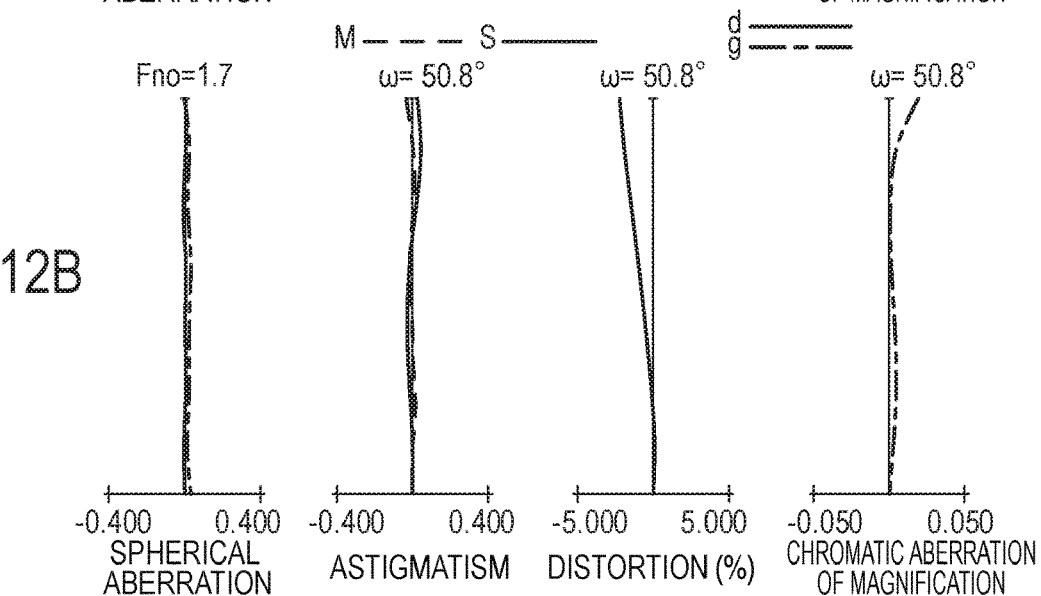
FIG. 12B illustrates longitudinal aberration graphs when focused on an object at an object distance of 1.0 m in Numerical Embodiment 6.
Figure 12C:
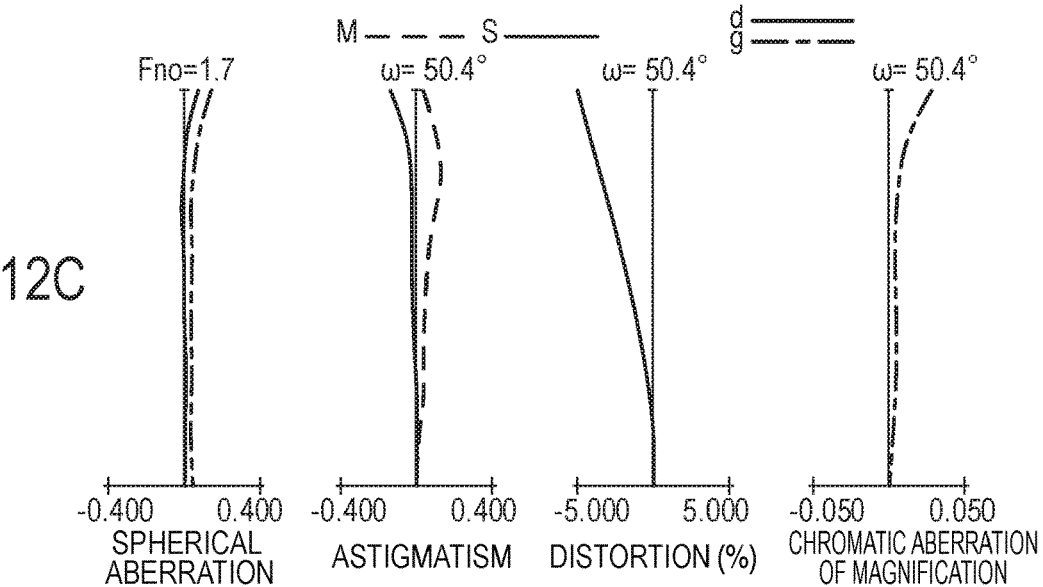
FIG. 12C illustrates longitudinal aberration graphs when focused on an object at an object distance of 0.3 m in Numerical Embodiment 6.

FIG. 11 is a cross-sectional view of lenses when focused at infinity in a fixed focal length lens that is Embodiment 6 (Numerical Embodiment 6) of the present invention. FIGS. 12A, 12B and 12C illustrate longitudinal aberration graphs when focused on an object at infinity, 1.0 m and 0.3 m, respectively.

In FIG. 11, the fixed focal length lens includes, in order from an object side to an image side, a first lens unit L1 having a positive refractive power that does not move for focusing, and furthermore, a second lens unit L2 having a positive refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a meniscus concave lens that is convex toward the object side, a cemented lens consisting of a biconcave lens and a biconvex lens, and a biconvex lens. The first surface and the second surface are aspherical surfaces, and mainly perform correction of distortion and astigmatism. In addition, the fourth surface and the eighth surface are aspherical surfaces, and mainly perform correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to an seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a biconvex lens. Further, the twenty-third surface is an aspherical shape, and mainly performs correction of spherical aberration and astigmatism.

Table 1 lists the corresponding values for the respective conditional expressions of the present embodiment. The present embodiment satisfies expressions (1) to (5) and achieves a wider angle of view, with the image-taking angle of view (angle of view) being 101.00°. Furthermore, the present embodiment realizes a fixed focal length lens having high optical performance in which aberrations are favorably corrected over the entire focusing range.

Embodiment 7

Figure 14A:
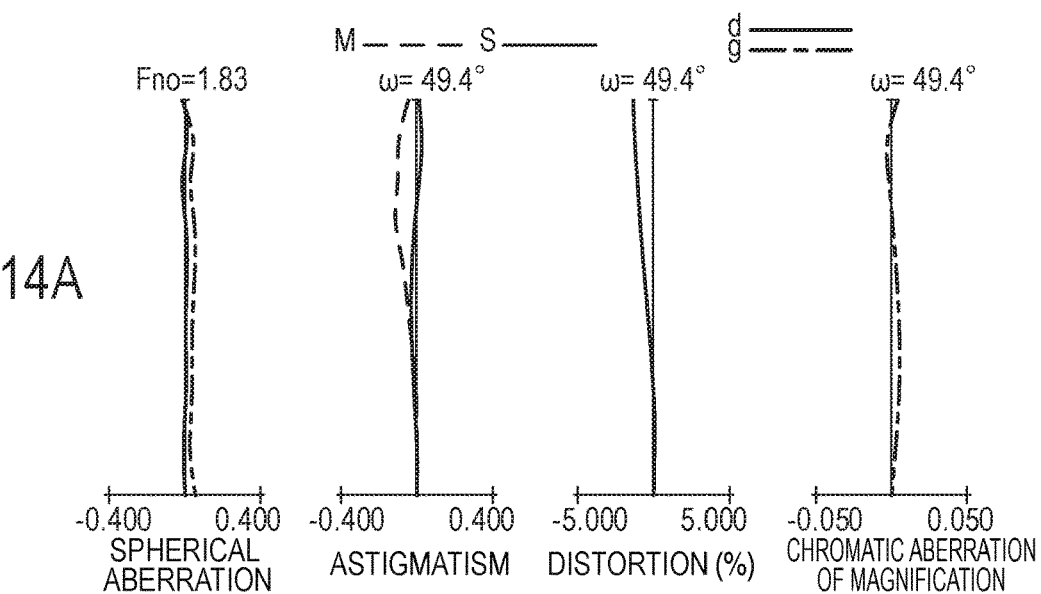
FIG. 14A illustrates longitudinal aberration graphs when focused on an object at an object distance of infinity in Numerical Embodiment 7.
Figure 14B:
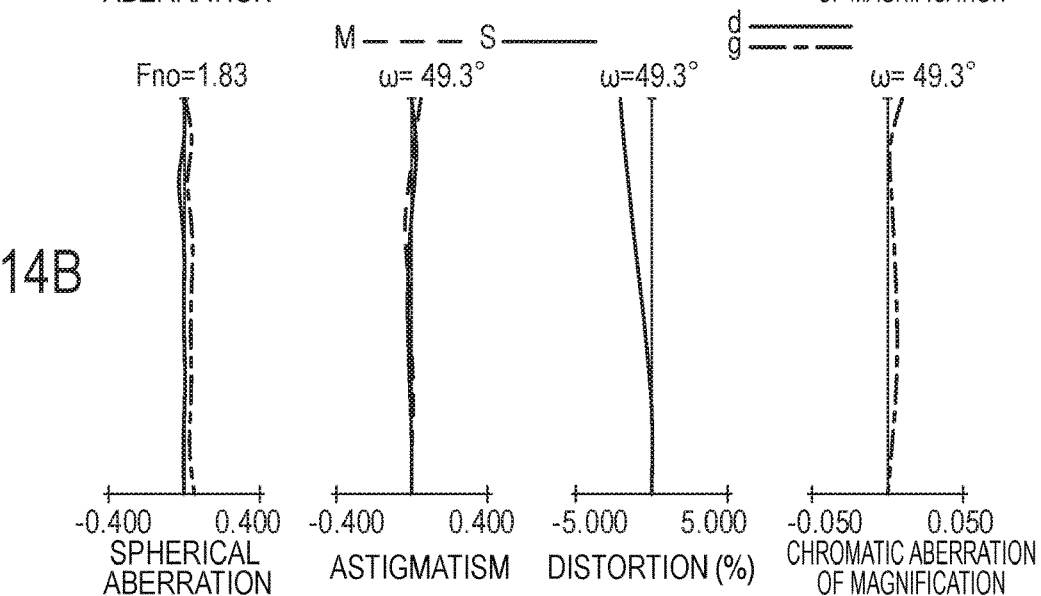
FIG. 14B illustrates longitudinal aberration graphs when focused on an object at an object distance of 1.0 m in Numerical Embodiment 7.
Figure 14C:
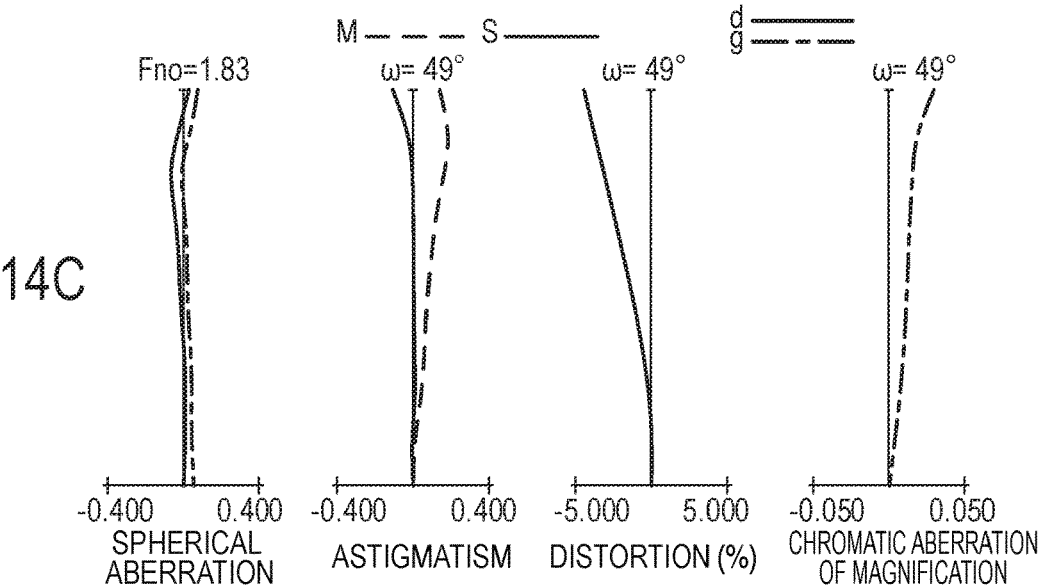
FIG. 14C illustrates longitudinal aberration graphs when focused on an object at an object distance of 0.3 m in Numerical Embodiment 7.
Figure 15:
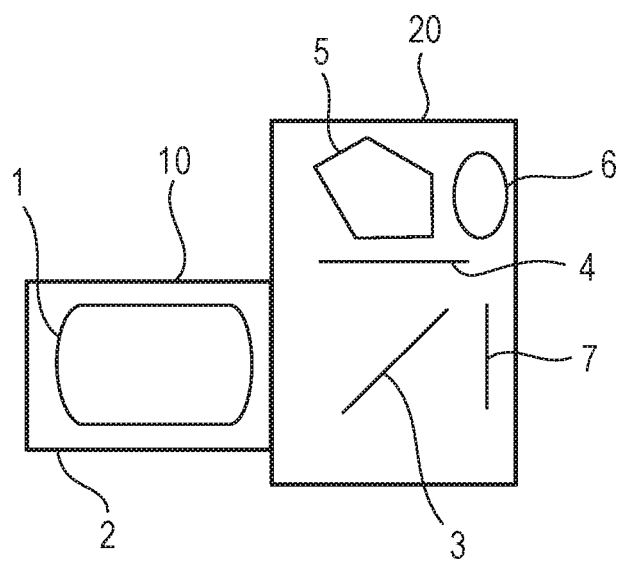
FIG. 15 is a schematic view of main portions of an image pickup apparatus of the present invention.

FIG. 13 is a cross-sectional view of lenses when focused at infinity in a fixed focal length lens that is Embodiment 7 (Numerical Embodiment 7) of the present invention. FIGS. 14A, 14B and 14C illustrate longitudinal aberration graphs when focused on an object at infinity, 1.0 m and 0.3 m, respectively.

In FIG. 13 the fixed focal length lens includes, in order from an object side to an image side, a first lens unit L1 having a positive refractive power that does not move for focusing, and furthermore, a second lens unit L2 having a positive refractive power that, when shifting focus to a nearby object from infinity, moves to the object side, a third lens unit L3 having a positive refractive power that, when shifting focus to a nearby object from infinity, moves to the object side by a movement amount that is different from a movement amount of the second lens unit L2, and a fourth lens unit L4 having a negative refractive power that does not move for focusing.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a meniscus concave lens that is convex toward the object side, a cemented lens consisting of a biconcave lens and a biconvex lens, and a biconvex lens. The first surface and the second surface are aspherical surfaces, and mainly perform correction of distortion and astigmatism. In addition, the fourth surface and the eighth surface are aspherical surfaces, and mainly perform correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to a seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a cemented lens consisting of a meniscus concave lens which is concave toward the image side and a biconvex lens, and a biconvex lens. Further, the twenty-third surface is an aspherical surface, and mainly performs correction of spherical aberration and astigmatism. The fourth lens unit L4 corresponds to a twenty-fifth surface to a twenty-sixth surface. The fourth lens unit L4 consists of a biconcave lens.

Table 1 lists the corresponding values for the respective conditional expressions of the present embodiment. The present embodiment satisfies expressions (1) to (5), and achieves a wider angle of view, with the image-taking angle of view (angle of view) being 97.98°. Furthermore, the present embodiment realizes a fixed focal length lens having high optical performance in which aberrations are favorably corrected over the entire focusing range.

(Numerical Embodiment 1)
Unit: mm

Surface Data

| Surface Number | r | d | nd | vd | Effective Diameter |
|---|---|---|---|---|---|
| 1* | 280.047 | 2.32 | 1.60311 | 60.6 | 62.24 |
| 2 | 24.883 | 17.51 | | | 44.69 |
| 3 | −99.771 | 1.88 | 1.78800 | 47.4 | 43.57 |
| 4 | 47.733 | 1.09 | | | 41.18 |
| 5 | 52.034 | 1.55 | 1.89286 | 20.4 | 41.38 |
| 6 | 25.001 | 10.58 | 1.74000 | 28.3 | 39.55 |
| 7 | 116.448 | 0.23 | | | 39.35 |
| 8* | 38.596 | 9.98 | 1.91650 | 31.6 | 39.72 |
| 9 | −92.636 | (Variable) | | | 38.57 |
| 10 | 58.094 | 5.80 | 1.85026 | 32.3 | 27.66 |
| 11 | −46.620 | 1.49 | 1.60342 | 38.0 | 25.55 |
| 12 | 19.625 | 5.08 | | | 22.63 |
| 13 | −76.613 | 1.30 | 1.65412 | 39.7 | 22.74 |
| 14 | 76.613 | 0.20 | | | 23.42 |
| 15 | 26.450 | 6.53 | 1.49700 | 81.5 | 24.87 |
| 16 | −60.404 | (Variable) | | | 24.87 |
| 17 (Stop) | ∞ | 7.32 | | | 24.14 |
| 18 | −19.091 | 3.99 | 1.48749 | 70.2 | 23.44 |
| 19 | −15.527 | 1.65 | 1.84666 | 23.8 | 24.23 |
| 20 | −44.569 | 0.20 | | | 27.88 |
| 21 | 100.123 | 8.30 | 1.61800 | 63.4 | 31.47 |
| 22 | −28.402 | 0.19 | | | 32.88 |
| 23* | −116.747 | 6.01 | 1.85400 | 40.4 | 34.17 |
| 24 | −33.943 | (Variable) | | | 36.22 |
| Image Plane | ∞ | | | | |

Aspherical Surface Data

First Surface

K = 0.00000e+000   A4 = −2.49717e−005   A6 = −1.20624e−006   A8 = −6.71315e−009
A10 = −4.17725e−012   A12 = 2.55967e−015   A14 = −9.63712e−019   A16 = −1.63231e−022
A3 = 7.67939e−005   A5 = 8.06146e−006   A7 = 1.12499e−007   A9 = 2.43200e−010
A11 = −2.99427e−014   A13 = −1.91367e−017   A15 = 2.34031e−020

Eighth Surface

K = −2.54800e+000   A4 = 6.88677e−006   A6 = 5.14663e−007   A8 = 3.92487e−009
A10 = −9.30826e−012   A12 = 4.26623e−014   A14 = −2.18804e−017   A16 = −4.76121e−020
A3 = −1.50859e−005   A5 = −2.56182e−006   A7 = −6.24564e−008   A9 = −3.11678e−011
A11 = 8.49317e−014   A13 = −1.87343e−015   A15 = 2.84800e−018

Twenty-third Surface

K = 0.00000e+000   A4 = −1.19705e−005   A6 = −2.93407e−009   A8 = −6.98369e−012
A10 = −1.35994e−014

Various Data

| | Infinity | 50f | Closest |
|---|---|---|---|
| Focal Length | 20.50 | 20.45 | 20.26 |
| F-number | 1.45 | 1.45 | 1.45 |
| Half Angle of View | 46.54 | 46.54 | 46.54 |
| Image Height | 21.64 | 21.64 | 21.64 |
| Total Length of Lens | 100.04 | 99.55 | 97.71 |
| BF | 38.32 | 38.81 | 40.64 |
| d9 | 4.60 | 4.26 | 2.99 |
| d16 | 2.22 | 2.07 | 1.51 |
| d24 | 38.32 | 38.81 | 40.64 |
| Entrance Pupil Position | 27.02 | 26.83 | 26.17 |

-continued (Numerical Embodiment 1)
Unit: mm

| | | | |
|---|---|---|---|
| Exit Pupil Position | −59.13 | −59.13 | −59.13 |
| Front Principal Point Position | 43.20 | 42.99 | 42.22 |
| Rear Principal Point Position | 17.82 | 17.89 | 18.14 |

Lens Unit Data

| Unit | Starting Surface | Focal Length | Unit Length | Front Principal Point Position | Rear Principal Point Position |
|---|---|---|---|---|---|
| 1 | 1 | 118.53 | 45.15 | 72.62 | 95.90 |
| 2 | 10 | 752.47 | 20.41 | 38.48 | 24.15 |
| 3 | 17 | 37.06 | 27.66 | 24.02 | 9.13 |

Single Lens Data

| Lens | Starting Surface | Focal Length |
|---|---|---|
| 1 | 1 | −45.44 |
| 2 | 3 | −40.74 |
| 3 | 5 | −55.40 |
| 4 | 6 | 41.00 |
| 5 | 8 | 30.85 |
| 6 | 10 | 31.21 |
| 7 | 11 | −22.70 |
| 8 | 13 | −58.37 |
| 9 | 15 | 37.96 |
| 10 | 18 | 124.81 |
| 11 | 19 | −28.90 |
| 12 | 21 | 36.71 |
| 13 | 23 | 54.22 |

(Numerical Embodiment 2)
Unit: mm

Surface Data

| Surface Number | r | d | nd | vd | Effective Diameter |
|---|---|---|---|---|---|
| 1* | 949.422 | 2.32 | 1.58913 | 61.1 | 60.00 |
| 2* | 28.202 | 12.57 | | | 45.05 |
| 3* | 66.821 | 1.88 | 1.76450 | 49.1 | 43.96 |
| 4* | 21.139 | 14.08 | | | 34.85 |
| 5 | 193.044 | 1.55 | 1.80810 | 22.8 | 32.50 |
| 6 | 26.174 | 6.66 | 1.85025 | 30.1 | 30.95 |
| 7 | 132.604 | 0.64 | | | 30.24 |
| 8* | 38.698 | 6.39 | 2.00330 | 28.3 | 29.39 |
| 9 | −165.948 | (Variable) | | | 27.77 |
| 10 | 277.202 | 2.64 | 1.90043 | 37.4 | 26.77 |
| 11 | −110.374 | 1.50 | 1.49700 | 81.5 | 26.53 |
| 12 | 21.598 | 4.48 | | | 24.82 |
| 13 | 2339.224 | 1.48 | 1.95375 | 32.3 | 24.99 |
| 14 | 51.564 | 0.20 | | | 25.41 |
| 15 | 30.859 | 7.90 | 1.59522 | 67.7 | 26.89 |
| 16 | −42.891 | (Variable) | | | 27.12 |
| 17 (Stop) | ∞ | 7.72 | | | 26.25 |
| 18 | −43.169 | 7.10 | 1.49700 | 81.5 | 24.72 |
| 19 | −15.131 | 1.28 | 1.95375 | 32.3 | 24.79 |
| 20 | −80.567 | 0.19 | | | 28.64 |
| 21 | 83.139 | 8.98 | 1.49700 | 81.5 | 31.11 |
| 22 | −25.265 | 0.20 | | | 31.82 |
| 23* | −340.464 | 5.69 | 1.69350 | 53.2 | 34.14 |
| 24 | −31.701 | (Variable) | | | 35.36 |
| Image Plane | ∞ | | | | |

Aspherical Surface Data

First Surface

K = 0.00000e+000   A4 = −1.96445e−006   A6 = −1.29088e−007   A8 = 1.45979e−010
A10 = 3.90012e−013   A12 = −8.60266e−016   A14 = −1.78441e−020   A16 = 2.71561e−023
A3 = 4.24807e−004   A5 = 8.90521e−007   A7 = 4.93011e−009   A9 = −1.80049e−011
A11 = 1.36193e−014   A13 = 1.51683e−017   A15 = −2.53053e−021

(Numerical Embodiment 2)
Unit: mm

Second Surface

K = 0.00000e+000    A4 = −3.75301e−005    A6 = −4.41979e−007    A8 = 4.26527e−010
A10 = 5.25512e−012    A12 = −5.36317e−015    A14 = 8.48554e−018    A16 = 8.82134e−021
A3 = 5.11759e−004    A5 = 5.13386e−006    A7 = 1.79877e−008    A9 = −1.00668e−010
A11 = −6.79196e−014    A13 = 1.63184e−016    A15 = −5.41991e−019

Third Surface

K = −6.94161e+001    A4 = −6.26156e−006    A6 = 1.17907e−008    A8 = −2.33610e−011
A10 = 4.80682e−014    A12 = −3.67496e−017

Fourth Surface

K = −5.37619e−001    A4 = −1.88729e−005    A6 = 6.82017e−008    A8 = −4.68802e−011
A10 = 2.09429e−013    A12 = −3.87593e−016

Eighth Surface

K = −2.00664e+001    A4 = 2.64725e−005    A6 = −1.35074e−006    A8 = 1.34098e−008
A10 = 7.13576e−011    A12 = −4.11611e−013    A14 = −9.37868e−016    A16 = −3.36774e−019
A3 = 2.07731e−005    A5 = 6.13636e−006    A7 = 4.31503e−008    A9 = −1.77876e−009
A11 = 2.45416e−012    A13 = 2.37701e−014    A15 = 2.55919e−017

Twenty-third Surface

K = 2.26396e+002    A4 = −1.45997e−005    A6 = 4.59615e−008    A8 = −4.06717e−010
A10 = 1.89587e−012    A12 = −5.25035e−015    A14 = 7.76779e−018    A16 = −4.87085e−021

Various Data

|  | Infinity | 50f | Closest |
| --- | --- | --- | --- |
| Focal Length | 16.40 | 16.36 | 16.21 |
| F-number | 1.45 | 1.45 | 1.45 |
| Half Angle of View | 52.84 | 52.84 | 52.84 |
| Image Height | 21.64 | 21.64 | 21.64 |
| Total Length of Lens | 98.97 | 98.65 | 97.42 |
| BF | 38.50 | 38.83 | 40.05 |
| d9 | 2.40 | 2.10 | 1.00 |
| d16 | 1.15 | 1.12 | 0.99 |
| d24 | 38.50 | 38.83 | 40.05 |
| Entrance Pupil Position | 23.10 | 23.02 | 22.71 |
| Exit Pupil Position | −77.68 | −77.68 | −77.68 |
| Front Principal Point Position | 37.19 | 37.08 | 36.66 |
| Rear Principal Point Position | 22.10 | 22.17 | 22.41 |

Lens Unit Data

| Unit | Starting Surface | Focal Length | Unit Length | Front Principal Point Position | Rear Principal Point Position |
| --- | --- | --- | --- | --- | --- |
| 1 | 1 | 60.74 | 46.08 | 52.62 | 72.22 |
| 2 | 10 | 661.35 | 18.20 | 97.74 | 99.15 |
| 3 | 17 | 40.23 | 31.16 | 27.54 | 9.67 |

Single Lens Data

| Lens | Starting Surface | Focal Length |
| --- | --- | --- |
| 1 | 1 | −49.38 |
| 2 | 3 | −41.18 |
| 3 | 5 | −37.63 |
| 4 | 6 | 37.28 |
| 5 | 8 | 31.77 |
| 6 | 10 | 87.95 |
| 7 | 11 | −36.21 |
| 8 | 13 | −55.30 |
| 9 | 15 | 31.41 |
| 10 | 18 | 43.24 |
| 11 | 19 | −19.72 |
| 12 | 21 | 40.09 |
| 13 | 23 | 50.03 |

(Numerical Embodiment 3)
Unit: mm

Surface Data

| Surface Number | r | d | nd | vd | Effective Diameter |
|---|---|---|---|---|---|
| 1* | 1180.079 | 2.32 | 1.58913 | 61.1 | 60.43 |
| 2* | 23.017 | 16.52 | | | 42.25 |
| 3 | 83.140 | 1.88 | 1.90270 | 31.0 | 34.44 |
| 4* | 22.277 | 8.43 | | | 27.34 |
| 5 | −44.215 | 1.55 | 1.59522 | 67.7 | 27.05 |
| 6 | 125.005 | 4.81 | 1.67300 | 38.1 | 26.90 |
| 7 | −100.005 | 0.50 | | | 26.76 |
| 8* | 36.421 | 6.55 | 1.88300 | 40.8 | 25.84 |
| 9 | −61.097 | (Variable) | | | 24.49 |
| 10 | −488.884 | 3.57 | 1.88300 | 40.8 | 20.64 |
| 11 | −46.620 | 1.50 | 1.53775 | 74.7 | 20.50 |
| 12 | 19.625 | 3.84 | | | 19.63 |
| 13 | −76.613 | 1.48 | 1.59522 | 67.7 | 19.85 |
| 14 | 76.613 | 0.20 | | | 20.81 |
| 15 | 22.009 | 7.35 | 1.51742 | 52.4 | 22.85 |
| 16 | −37.419 | (Variable) | | | 22.86 |
| 17 (Stop) | ∞ | 2.00 | | | 21.81 |
| 18 | −318.985 | 8.20 | 1.48749 | 70.2 | 21.19 |
| 19 | −13.949 | 1.28 | 1.95375 | 32.3 | 20.37 |
| 20 | 394.905 | 0.19 | | | 22.35 |
| 21 | 40.646 | 9.16 | 1.49700 | 81.5 | 23.70 |
| 22 | −21.348 | 0.20 | | | 24.58 |
| 23* | 2812.935 | 3.93 | 1.53775 | 74.7 | 23.37 |
| 24 | −33.043 | (Variable) | | | 24.54 |
| Image Plane | ∞ | | | | |

Aspherical Surface Data

First Surface

K = 0.00000e+000   A4 = 1.77329e−005   A6 = 4.29632e−008   A8 = −1.41065e−010
A10 = −1.12083e−013   A12 = 7.31084e−017   A14 = 4.81227e−020   A16 = 5.31826e−023
A3 = 6.18326e−004   A5 = −2.67106e−006   A7 = 3.28702e−009   A9 = 3.31429e−012
A11 = 8.43003e−016   A13 = −1.05966e−018   A15 = −3.34316e−021

Second Surface

K = 0.00000e+000   A4 = −5.01644e−005   A6 = −8.26105e−007   A8 = −5.49574e−010
A10 = 7.02471e−013   A12 = −2.92132e−014   A14 = −3.83423e−017   A16 = −2.41715e−020
A3 = 8.75395e−004   A5 = 7.23629e−006   A7 = 4.49034e−008   A9 = −7.56304e−011
A11 = 4.47750e−013   A13 = 9.35061e−016   A15 = 1.54421e−018

Fourth Surface

K = −4.89671e−001   A4 = 1.65012e−005   A6 = 5.86757e−008   A8 = 5.90271e−011
A10 = 2.25842e−012   A12 = −6.59490e−015

Eighth Surface

K = −3.35493e+000   A4 = −6.43318e−005   A6 = −2.31953e−006   A8 = 1.16082e−008
A10 = 7.55857e−011   A12 = −9.91206e−013   A14 = −3.71235e−015   A16 = −2.44263e−018
A3 = 1.48040e−004   A5 = 1.63014e−005   A7 = 1.22964e−007   A9 = −2.09983e−009
A11 = 7.20122e−012   A13 = 6.76922e−014   A15 = 1.42056e−016

Twenty-third Surface

K = −8.15635e+007   A4 = −2.35386e−005   A6 = 7.47806e−008   A8 = −2.52730e−009
A10 = 3.40711e−011   A12 = −2.66461e−013   A14 = 1.06605e−015   A16 = −1.71741e−018

Various Data

| | Infinity | 50f | Closest |
|---|---|---|---|
| Focal Length | 14.40 | 14.38 | 14.29 |
| F-number | 1.83 | 1.83 | 1.83 |
| Half Angle of View | 56.35 | 56.35 | 56.35 |
| Image Height | 21.64 | 21.64 | 21.64 |
| Total Length of Lens | 88.57 | 88.32 | 87.42 |
| BF | 38.79 | 39.04 | 39.94 |
| d9 | 1.89 | 1.69 | 0.98 |
| d16 | 1.24 | 1.19 | 1.00 |
| d24 | 38.79 | 39.04 | 39.94 |
| Entrance Pupil Position | 20.65 | 20.60 | 20.43 |
| Exit Pupil Position | −35.35 | −35.35 | −35.35 |
| Front Principal Point Position | 32.25 | 32.19 | 31.97 |
| Rear Principal Point Position | 24.39 | 24.43 | 24.58 |

(Numerical Embodiment 3)
Unit: mm

Lens Unit Data

| Unit | Starting Surface | Focal Length | Unit Length | Front Principal Point Position | Rear Principal Point Position |
|---|---|---|---|---|---|
| 1 | 1 | 61.39 | 42.55 | 54.51 | 89.33 |
| 2 | 10 | 263.17 | 17.94 | 50.69 | 46.68 |
| 3 | 17 | 45.02 | 24.95 | 22.15 | 8.27 |

Single Lens Data

| Lens | Starting Surface | Focal Length |
|---|---|---|
| 1 | 1 | −39.88 |
| 2 | 3 | −34.21 |
| 3 | 5 | −54.69 |
| 4 | 6 | 83.27 |
| 5 | 8 | 26.68 |
| 6 | 10 | 58.14 |
| 7 | 11 | −25.48 |
| 8 | 13 | −64.13 |
| 9 | 15 | 27.96 |
| 10 | 18 | 29.66 |
| 11 | 19 | −14.10 |
| 12 | 21 | 29.62 |
| 13 | 23 | 60.76 |

(Numerical Embodiment 4)
Unit: mm

Surface Data

| Surface Number | r | d | nd | vd | Effective Diameter |
|---|---|---|---|---|---|
| 1* | 1163.304 | 2.32 | 1.51633 | 64.1 | 60.49 |
| 2* | 22.678 | 16.36 | | | 42.71 |
| 3 | 55.976 | 1.88 | 1.90270 | 31.0 | 35.33 |
| 4* | 23.969 | 9.17 | | | 28.58 |
| 5 | −44.927 | 1.55 | 1.59522 | 67.7 | 28.32 |
| 6 | 51.189 | 7.17 | 1.81600 | 46.6 | 28.39 |
| 7 | −123.517 | 0.50 | | | 28.13 |
| 8* | 49.737 | 5.76 | 1.90270 | 31.0 | 27.18 |
| 9 | −104.809 | (Variable) | | | 25.87 |
| 10 | 212.838 | 4.41 | 1.88300 | 40.8 | 22.67 |
| 11 | −46.620 | 1.50 | 1.51742 | 52.4 | 22.44 |
| 12 | 19.625 | 4.37 | | | 21.09 |
| 13 | −76.613 | 1.30 | 1.54072 | 47.2 | 21.27 |
| 14 | 76.613 | 0.20 | | | 22.15 |
| 15 | 22.844 | 7.56 | 1.49700 | 81.5 | 24.05 |
| 16 | −39.053 | (Variable) | | | 23.99 |
| 17 (Stop) | ∞ | 2.21 | | | 22.79 |
| 18 | −64.938 | 6.31 | 1.49700 | 81.5 | 22.31 |
| 19 | −14.794 | 1.28 | 1.89190 | 37.1 | 22.00 |
| 20 | −785.602 | 0.19 | | | 24.07 |
| 21 | 42.469 | 8.69 | 1.49700 | 81.5 | 25.48 |
| 22 | −22.898 | 0.20 | | | 25.97 |
| 23* | 3778.661 | 3.46 | 1.51633 | 64.1 | 24.29 |
| 24 | −41.203 | (Variable) | | | 23.98 |
| Image Plane | ∞ | | | | |

Aspherical Surface Data

First Surface

K = 0.00000e+000   A4 = 1.97328e−005   A6 = 4.23575e−009   A8 = −2.10611e−010
A10 = −1.01582e−013   A12 = −9.70339e−018   A14 = 3.42335e−020   A16 = 5.55518e−023
A3 = 5.64574e−004   A5 = −2.35252e−006   A7 = 5.42797e−009   A9 = 4.20339e−012
A11 = 1.62898e−015   A13 = 1.00686e−018   A15 = −3.47088e−021

Second Surface

K = 0.00000e+000   A4 = −4.38226e−005   A6 = −8.91755e−007   A8 = −9.57961e−010
A10 = 1.83223e−012   A12 = −2.92323e−014   A14 = −3.77660e−017   A16 = −2.15386e−020

-continued (Numerical Embodiment 4)
Unit: mm

| | | | |
|---|---|---|---|
| A3 = 7.78641e−004 | A5 = 7.34157e−006 | A7 = 5.25007e−008 | A9 = −7.63818e−011 |
| A11 = 4.04236e−013 | A13 = 9.64100e−016 | A15 = 1.44261e−018 | |

Fourth Surface

| | | | |
|---|---|---|---|
| K = −4.78402e−001 | A4 = 2.00401e−005 | A6 = 7.47820e−008 | A8 = −2.72167e−010 |
| A10 = 3.92382e−012 | A12 = −8.64942e−015 | | |

Eighth Surface

| | | | |
|---|---|---|---|
| K = −3.08804e+000 | A4 = −5.05584e−005 | A6 = −2.13437e−006 | A8 = 1.17144e−008 |
| A10 = 7.39486e−011 | A12 = −1.01833e−012 | A14 = −3.62864e−015 | A16 = −2.43159e−018 |
| A3 = 1.06578e−004 | A5 = 1.43808e−005 | A7 = 1.13428e−007 | A9 = −2.08685e−009 |
| A11 = 7.53361e−012 | A13 = 6.77213e−014 | A15 = 1.39215e−016 | |

Twenty-third Surface

| | | | |
|---|---|---|---|
| K = −1.83227e+008 | A4 = −2.13547e−005 | A6 = 2.95168e−008 | A8 = −1.61687e−009 |
| A10 = 2.36512e−011 | A12 = −2.00959e−013 | A14 = 8.81487e−016 | A16 = −1.57627e−018 |

Various Data

| | Infinity | 50f | Closest |
|---|---|---|---|
| Focal Length | 17.16 | 17.14 | 17.06 |
| F-number | 1.83 | 1.83 | 1.83 |
| Half Angle of View | 51.58 | 51.58 | 51.58 |
| Image Height | 21.64 | 21.64 | 21.64 |
| Total Length of Lens | 90.00 | 89.66 | 88.39 |
| BF | 40.51 | 40.86 | 42.12 |
| d9 | 2.32 | 2.04 | 0.96 |
| d16 | 1.29 | 1.23 | 1.00 |
| d24 | 40.51 | 40.86 | 42.12 |
| Entrance Pupil Position | 23.05 | 22.98 | 22.71 |
| Exit Pupil Position | −26.76 | −26.76 | −26.76 |
| Front Principal Point Position | 35.83 | 35.75 | 35.45 |
| Rear Principal Point Position | 23.35 | 23.39 | 23.51 |

Lens Unit Data

| Unit | Starting Surface | Focal Length | Unit Length | Front Principal Point Position | Rear Principal Point Position |
|---|---|---|---|---|---|
| 1 | 1 | 166.67 | 44.71 | 112.16 | 207.88 |
| 2 | 10 | 120.10 | 19.34 | 22.99 | 10.92 |
| 3 | 17 | 52.30 | 22.35 | 21.33 | 9.26 |

Single Lens Data

| Lens | Starting Surface | Focal Length |
|---|---|---|
| 1 | 1 | −44.83 |
| 2 | 3 | −47.77 |
| 3 | 5 | −39.96 |
| 4 | 6 | 45.18 |
| 5 | 8 | 38.04 |
| 6 | 10 | 43.66 |
| 7 | 11 | −26.49 |
| 8 | 13 | −70.63 |
| 9 | 15 | 30.23 |
| 10 | 18 | 37.00 |
| 11 | 19 | −16.92 |
| 12 | 21 | 31.32 |
| 13 | 23 | 78.96 |

(Numerical Embodiment 5)
Unit: mm

Surface Data

| Surface Number | r | d | nd | vd | Effective Diameter |
|---|---|---|---|---|---|
| 1* | 786.437 | 2.32 | 1.58913 | 61.1 | 59.99 |
| 2* | 23.317 | 15.33 | | | 42.76 |
| 3 | 71.543 | 1.88 | 1.90270 | 31.0 | 36.89 |

-continued (Numerical Embodiment 5)
Unit: mm

| | | | | | |
|---|---|---|---|---|---|
| 4* | 27.499 | 9.40 | | | 29.68 |
| 5 | −43.005 | 1.55 | 1.59522 | 67.7 | 29.43 |
| 6 | 48.162 | 8.83 | 1.83481 | 42.7 | 29.66 |
| 7 | −77.046 | 0.98 | | | 29.40 |
| 8* | 54.835 | 5.79 | 1.90270 | 31.0 | 27.57 |
| 9 | −95.058 | (Variable) | | | 26.08 |
| 10 | 3175.719 | 3.83 | 1.79952 | 42.2 | 21.56 |
| 11 | −46.620 | 1.50 | 1.51742 | 52.4 | 21.26 |
| 12 | 19.625 | 4.05 | | | 20.19 |
| 13 | −76.613 | 2.15 | 1.53172 | 48.8 | 20.38 |
| 14 | 76.613 | 0.20 | | | 21.51 |
| 15 | 22.214 | 7.76 | 1.49700 | 81.5 | 23.37 |
| 16 | −32.303 | (Variable) | | | 23.31 |
| 17 (Stop) | ∞ | 2.00 | | | 21.71 |
| 18 | −49.363 | 6.36 | 1.49700 | 81.5 | 21.33 |
| 19 | −13.786 | 1.28 | 1.89190 | 37.1 | 20.94 |
| 20 | −211.156 | 0.19 | | | 22.95 |
| 21 | 39.341 | 11.42 | 1.49700 | 81.5 | 24.35 |
| 22 | −22.949 | 0.20 | | | 25.13 |
| 23* | 4718.395 | 4.46 | 1.51633 | 64.1 | 23.43 |
| 24 | −46.591 | (Variable) | | | 25.00 |
| Image Plane | ∞ | | | | |

Aspherical Surface Data

First Surface

K = 0.00000e+000  A4 = 1.67796e−005  A6 = 5.86457e−009  A8 = −2.15196e−010
A10 = −1.08763e−013  A12 = −2.41298e−017  A14 = 4.42912e−020  A16 = 5.70796e−023
A3 = 5.99992e−004  A5 = −2.20331e−006  A7 = 5.15079e−009  A9 = 4.65403e−012
A11 = 2.13928e−015  A13 = 6.95942e−019  A15 = −3.50094e−021

Second Surface

K = 0.00000e+000  A4 = −3.71091e−005  A6 = −8.73918e−007  A8 = −9.88783e−010
A10 = 2.23200e−012  A12 = −2.89392e−014  A14 = −3.68758e−017  A16 = −2.10976e−020
A3 = 7.84002e−004  A5 = 6.90148e−006  A7 = 5.32361e−008  A9 = −8.15822e−011
A11 = 3.88751e−013  A13 = 9.52296e−016  A15 = 1.41849e−018

Fourth Surface

K = −1.02116e+000  A4 = 1.99020e−005  A6 = 9.13097e−008  A8 = −4.19364e−010
A10 = 4.19927e−012  A12 = −8.52278e−015

Eighth Surface

K = −2.76235e+000  A4 = −4.54952e−005  A6 = −1.97684e−006  A8 = 1.19439e−008
A10 = 7.42030e−011  A12 = −1.01709e−012  A14 = −3.60216e−015  A16 = −2.09629e−018
A3 = 8.94510e−005  A5 = 1.31633e−005  A7 = 1.02730e−007  A9 = −2.07058e−009
A11 = 7.30100e−012  A13 = 6.91457e−014  A15 = 1.28874e−016

Twenty-third Surface

K = −3.41516e+008  A4 = −2.11548e−005  A6 = 1.49873e−008  A8 = −1.43662e−009
A10 = 2.15496e−011  A12 = −1.81946e−013  A14 = 7.76009e−016  A16 = −1.34321e−018

Various Data

| | Infinity | 50f | Closest |
|---|---|---|---|
| Focal Length | 16.04 | 16.00 | 15.86 |
| F-number | 1.83 | 1.83 | 1.83 |
| Half Angle of View | 53.45 | 53.45 | 53.45 |
| Image Height | 21.64 | 21.64 | 21.64 |
| Total Length of Lens | 94.99 | 94.67 | 93.46 |
| BF | 38.80 | 39.13 | 40.33 |
| d9 | 2.21 | 1.95 | 1.00 |
| d16 | 1.31 | 1.24 | 0.99 |
| d24 | 38.80 | 39.13 | 40.33 |
| Entrance Pupil Position | 22.01 | 21.94 | 21.69 |
| Exit Pupil Position | −33.16 | −33.16 | −33.16 |
| Front Principal Point Position | 34.48 | 34.39 | 34.06 |
| Rear Principal Point Position | 22.76 | 22.84 | 23.10 |

(Numerical Embodiment 5)
Unit: mm

Lens Unit Data

| Unit | Starting Surface | Focal Length | Unit Length | Front Principal Point Position | Rear Principal Point Position |
|---|---|---|---|---|---|
| 1 | 1 | 60.61 | 46.08 | 53.60 | 81.35 |
| 2 | 10 | 125.01 | 19.49 | 30.48 | 21.39 |
| 3 | 17 | 53.12 | 25.91 | 24.42 | 12.03 |

Single Lens Data

| Lens | Starting Surface | Focal Length |
|---|---|---|
| 1 | 1 | −40.83 |
| 2 | 3 | −50.50 |
| 3 | 5 | −37.93 |
| 4 | 6 | 36.68 |
| 5 | 8 | 39.24 |
| 6 | 10 | 57.50 |
| 7 | 11 | −26.49 |
| 8 | 13 | −71.69 |
| 9 | 15 | 27.80 |
| 10 | 18 | 36.33 |
| 11 | 19 | −16.59 |
| 12 | 21 | 31.05 |
| 13 | 23 | 89.38 |

(Numerical Embodiment 6)
Unit: mm

Surface Data

| Surface Number | r | d | nd | vd | Effective Diameter |
|---|---|---|---|---|---|
| 1* | 1136.931 | 2.32 | 1.58313 | 59.4 | 59.92 |
| 2* | 22.749 | 15.34 | | | 42.89 |
| 3 | 74.032 | 1.88 | 1.90270 | 31.0 | 36.79 |
| 4* | 32.210 | 9.39 | | | 30.54 |
| 5 | −41.165 | 1.55 | 1.49700 | 81.5 | 30.36 |
| 6 | 91.886 | 5.92 | 1.90043 | 37.4 | 30.82 |
| 7 | −90.508 | 0.50 | | | 30.79 |
| 8* | 63.384 | 5.75 | 1.90270 | 31.0 | 29.54 |
| 9 | −128.499 | (Variable) | | | 28.16 |
| 10 | 125.910 | 4.66 | 1.81600 | 46.6 | 24.21 |
| 11 | −46.620 | 1.50 | 1.51742 | 52.4 | 23.88 |
| 12 | 19.625 | 4.84 | | | 22.17 |
| 13 | −76.613 | 1.68 | 1.56732 | 42.8 | 22.35 |
| 14 | 76.613 | 0.20 | | | 23.40 |
| 15 | 23.374 | 7.18 | 1.49700 | 81.5 | 25.58 |
| 16 | −72.695 | (Variable) | | | 25.49 |
| 17 (Stop) | ∞ | 2.00 | | | 24.92 |
| 18 | −94.929 | 7.57 | 1.49700 | 81.5 | 24.63 |
| 19 | −15.574 | 1.28 | 1.89190 | 37.1 | 24.45 |
| 20 | −150.999 | 0.19 | | | 27.26 |
| 21 | 45.933 | 9.38 | 1.49700 | 81.5 | 29.38 |
| 22 | −24.756 | 0.20 | | | 29.73 |
| 23* | 4276.573 | 5.58 | 1.51633 | 64.1 | 27.36 |
| 24 | −41.214 | (Variable) | | | 26.79 |
| Image Plane | ∞ | | | | |

Aspherical Surface Data

First Surface

K = 0.00000e+000  A4 = −1.43631e−005  A6 = 2.83680e−009  A8 = −2.55113e−010
A10 = −8.65537e−014  A12 = −3.98936e−017  A14 = 1.00617e−019  A16 = 5.53976e−023
A3 = 7.10659e−004  A5 = −6.59966e−007  A7 = 4.40268e−009  A9 = 6.34594e−012
A11 = 1.33335e−015  A13 = 1.27279e−020  A15 = −4.24417e−021

Second Surface

K = 0.00000e+000  A4 = −8.46935e−005  A6 = −1.35642e−006  A8 = −2.45578e−009
A10 = 3.31914e−012  A12 = −3.05445e−014  A14 = −3.60729e−017  A16 = −2.48810e−020

(Numerical Embodiment 6)
Unit: mm

| | | | |
|---|---|---|---|
| A3 = 9.30501e−004 | A5 = 1.12556e−005 | A7 = 9.15283e−008 | A9 = −7.26938e−011 |
| A11 = 3.81277e−013 | A13 = 9.69473e−016 | A15 = 1.50361e−018 | |

Fourth Surface

| | | | |
|---|---|---|---|
| K = −8.93980e−001 | A4 = 2.09271e−005 | A6 = 7.65116e−008 | A8 = −3.83676e−010 |
| A10 = 3.40334e−012 | A12 = −6.85400e−015 | | |

Eighth Surface

| | | | |
|---|---|---|---|
| K = −4.19503e+000 | A4 = −4.17127e−005 | A6 = −1.64828e−006 | A8 = 1.05162e−008 |
| A10 = 6.88682e−011 | A12 = −1.00599e−012 | A14 = −3.53901e−015 | A16 = −1.34229e−018 |
| A3 = 1.01824e−004 | A5 = 1.18492e−005 | A7 = 7.56276e−008 | A9 = −1.73354e−009 |
| A11 = 5.95968e−012 | A13 = 7.45637e−014 | A15 = 1.02461e−016 | |

Twenty-third Surface

| | | | |
|---|---|---|---|
| K = −2.18049e+008 | A4 = −1.93727e−005 | A6 = 6.69563e−009 | A8 = −7.31034e−010 |
| A10 = 1.01393e−011 | A12 = −8.18714e−014 | A14 = 3.32855e−016 | A16 = −5.39375e−019 |

Various Data

| | Infinity | 50f | Closest |
|---|---|---|---|
| Focal Length | 17.83 | 17.82 | 17.76 |
| F-number | 1.70 | 1.70 | 1.70 |
| Half Angle of View | 50.50 | 50.50 | 50.50 |
| Image Height | 21.64 | 21.64 | 21.64 |
| Total Length of Lens | 92.65 | 92.29 | 90.92 |
| BF | 41.36 | 41.72 | 43.09 |
| d9 | 2.52 | 2.20 | 0.99 |
| d16 | 1.24 | 1.19 | 1.03 |
| d24 | 41.36 | 41.72 | 43.09 |
| Entrance Pupil Position | 22.52 | 22.43 | 22.12 |
| Exit Pupil Position | −32.96 | −32.96 | −32.96 |
| Front Principal Point Position | 36.07 | 35.98 | 35.63 |
| Rear Principal Point Position | 23.53 | 23.55 | 23.62 |

Lens Unit Data

| Unit | Starting Surface | Focal Length | Unit Length | Front Principal Point Position | Rear Principal Point Position |
|---|---|---|---|---|---|
| 1 | 1 | 196.38 | 42.65 | 123.55 | 225.48 |
| 2 | 10 | 585.06 | 20.05 | 60.98 | 51.33 |
| 3 | 17 | 43.28 | 26.19 | 20.06 | 4.42 |

Single Lens Data

| Lens | Starting Surface | Focal Length |
|---|---|---|
| 1 | 1 | −39.84 |
| 2 | 3 | −64.54 |
| 3 | 5 | −56.98 |
| 4 | 6 | 51.43 |
| 5 | 8 | 47.70 |
| 6 | 10 | 42.21 |
| 7 | 11 | −26.49 |
| 8 | 13 | −67.26 |
| 9 | 15 | 36.49 |
| 10 | 18 | 36.33 |
| 11 | 19 | −19.56 |
| 12 | 21 | 33.86 |
| 13 | 23 | 79.09 |

(Numerical Embodiment 7)
Unit: mm

Surface Data

| Surface Number | r | d | nd | vd | Effective Diameter |
|---|---|---|---|---|---|
| 1* | 376.340 | 2.32 | 1.51633 | 64.1 | 58.32 |
| 2* | 24.486 | 15.23 | | | 43.21 |
| 3 | 68.969 | 1.88 | 1.90270 | 31.0 | 35.95 |

(Numerical Embodiment 7)
Unit: mm

| | | | | | |
|---|---|---|---|---|---|
| 4* | 27.204 | 9.37 | | | 29.49 |
| 5 | −38.405 | 1.55 | 1.59522 | 67.7 | 29.22 |
| 6 | 72.985 | 7.60 | 1.81600 | 46.6 | 29.62 |
| 7 | −62.496 | 0.50 | | | 29.65 |
| 8* | 43.393 | 5.53 | 1.90270 | 31.0 | 27.81 |
| 9 | −381.271 | (Variable) | | | 26.21 |
| 10 | 438.306 | 4.04 | 1.88300 | 40.8 | 23.26 |
| 11 | −46.620 | 1.50 | 1.51742 | 52.4 | 22.94 |
| 12 | 19.625 | 4.62 | | | 21.57 |
| 13 | −76.613 | 1.48 | 1.54072 | 47.2 | 21.79 |
| 14 | 76.613 | 1.07 | | | 22.83 |
| 15 | 23.574 | 8.42 | 1.49700 | 81.5 | 25.78 |
| 16 | −36.610 | (Variable) | | | 25.72 |
| 17 (Stop) | ∞ | 2.50 | | | 24.18 |
| 18 | −44.580 | 6.34 | 1.49700 | 81.5 | 23.79 |
| 19 | −15.174 | 1.28 | 1.89190 | 37.1 | 23.56 |
| 20 | −99.612 | 0.23 | | | 25.97 |
| 21 | 41.974 | 8.64 | 1.49700 | 81.5 | 27.77 |
| 22 | −25.222 | 0.20 | | | 27.95 |
| 23* | 2782.761 | 3.90 | 1.51633 | 64.1 | 25.81 |
| 24 | −33.807 | (Variable) | | | 25.45 |
| 25 | −1032.087 | 1.00 | 1.51742 | 52.4 | 25.35 |
| 26 | 79.651 | 39.52 | | | 25.72 |
| Image Plane | ∞ | | | | |

Aspherical Surface Data

First Surface

K = 0.00000e+000  A4 = 2.38594e−006  A6 = 2.18938e−008  A8 = −2.20786e−010
A10 = −9.68907e−014  A12 = −1.18541e−018  A14 = 3.19021e−020  A16 = 1.07902e−022
A3 = 5.54140e−004  A5 = −1.51957e−006  A7 = 4.19701e−009  A9 = 5.15450e−012
A11 = 7.97491e−016  A13 = 1.97071e−018  A15 = −5.75481e−021

Second Surface

K = 0.00000e+000  A4 = −6.55286e−005  A6 = −1.04490e−006  A8 = −9.65226e−010
A10 = 1.61035e−012  A12 = −2.84591e−014  A14 = −3.95741e−017  A16 = −1.56662e−020
A3 = 7.88455e−004  A5 = 9.06413e−006  A7 = 6.13480e−008  A9 = −8.23057e−011
A11 = 4.03093e−013  A13 = 9.97239e−016  A15 = 1.30232e−018

Fourth Surface

K = −1.13672e+000  A4 = 2.13266e−005  A6 = 8.10213e−008  A8 = −5.74533e−010
A10 = 4.58600e−012  A12 = −8.65942e−015

Eighth Surface

K = −9.13025e−001  A4 = −5.51588e−005  A6 = −2.21310e−006  A8 = 1.13754e−008
A10 = 7.63159e−011  A12 = −1.03447e−012  A14 = −3.59192e−015  A16 = −2.58239e−018
A3 = 1.25816e−004  A5 = 1.48419e−005  A7 = 1.23284e−007  A9 = −2.14095e−009
A11 = 7.93337e−012  A13 = 6.62436e−014  A15 = 1.43735e−016

Twenty-third Surface

K = −6.91585e+007  A4 = −2.77923e−005  A6 = 4.33847e−008  A8 = −1.65159e−009
A10 = 2.15985e−011  A12 = −1.64462e−013  A14 = 6.49421e−016  A16 = −1.04017e−018

Various Data

| | Infinity | 50f | Closest |
|---|---|---|---|
| Focal Length | 18.81 | 18.75 | 18.52 |
| F-number | 1.83 | 1.83 | 1.83 |
| Half Angle of View | 48.99 | 48.99 | 48.99 |
| Image Height | 21.64 | 21.64 | 21.64 |
| Total Length of Lens | 93.37 | 93.37 | 93.37 |
| BF | 39.52 | 39.52 | 39.52 |
| d9 | 2.06 | 1.83 | 1.00 |
| d16 | 1.11 | 1.08 | 1.00 |
| d24 | 1.00 | 1.25 | 2.17 |
| Entrance Pupil Position | 24.31 | 24.25 | 24.01 |
| Exit Pupil Position | −26.50 | −26.66 | −27.27 |
| Front Principal Point Position | 37.76 | 37.65 | 37.25 |
| Rear Principal Point Position | 20.71 | 20.38 | 19.16 |

(Numerical Embodiment 7)
Unit: mm

Zoom Lens Unit Data

| Unit | Starting Surface | Focal Length | Unit Length | Front Principal Point Position | Rear Principal Point Position |
|---|---|---|---|---|---|
| 1 | 1 | 115.52 | 43.99 | 80.53 | 126.02 |
| 2 | 10 | 125.00 | 21.13 | 30.94 | 20.07 |
| 3 | 17 | 40.17 | 23.08 | 19.24 | 6.10 |
| 4 | 25 | −142.87 | 1.00 | 0.61 | −0.05 |

Single Lens Data

| Lens | Starting Surface | Focal Length |
|---|---|---|
| 1 | 1 | −50.84 |
| 2 | 3 | −50.85 |
| 3 | 5 | −42.06 |
| 4 | 6 | 42.33 |
| 5 | 8 | 43.43 |
| 6 | 10 | 47.91 |
| 7 | 11 | −26.49 |
| 8 | 13 | −70.60 |
| 9 | 15 | 30.26 |
| 10 | 18 | 43.19 |
| 11 | 19 | −20.21 |
| 12 | 21 | 33.11 |
| 13 | 23 | 64.72 |
| 14 | 25 | −142.87 |

TABLE 1

Corresponding values for each conditional expression in Numerical Embodiments 1 to 7

| Conditional Expression | | 1 | 2 | 3 | 4 | 5 | 6 | 7 |
|---|---|---|---|---|---|---|---|---|
| (1) | f1/f | 5.78 | 3.70 | 4.26 | 9.71 | 3.78 | 11.01 | 6.14 |
| (2) | f3/f2 | 0.05 | 0.06 | 0.17 | 0.44 | 0.42 | 0.07 | 0.32 |
| (3) | f/TD | 0.20 | 0.17 | 0.16 | 0.19 | 0.17 | 0.19 | 0.20 |
| (4) | LB1/f | 2.20 | 2.81 | 2.95 | 2.60 | 2.87 | 2.39 | 2.34 |
| (5) | |m2|/|m3| | 0.69 | 0.90 | 0.79 | 0.82 | 0.79 | 0.88 | 0.91 |
| f1 | | 118.53 | 60.74 | 61.39 | 166.67 | 60.61 | 196.38 | 115.52 |
| f2 | | 752.47 | 661.35 | 263.17 | 120.10 | 125.01 | 585.06 | 125.00 |
| f3 | | 37.06 | 40.23 | 45.02 | 52.30 | 53.12 | 43.28 | 40.17 |
| f | | 20.50 | 16.40 | 14.40 | 17.16 | 16.04 | 17.83 | 18.81 |
| TD | | 100.04 | 98.97 | 88.57 | 90.00 | 94.99 | 92.65 | 93.37 |
| LB1 | | 45.15 | 46.08 | 42.55 | 44.71 | 46.08 | 42.65 | 43.99 |
| m2 | | −1.61 | −1.40 | −0.91 | −1.32 | −1.21 | −1.53 | −1.06 |
| m3 | | −2.32 | −1.55 | −1.15 | −1.61 | −1.53 | −1.74 | −1.17 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-189811, filed Sep. 29, 2017, which is hereby incorporated by reference herein in its entirety.

What is claimed is:

1. A fixed focal length lens comprising, in order from an object side to an image side, a first lens unit having a positive refractive power, a second lens unit having a positive refractive power and a third lens unit having a positive refractive power, the second lens unit and the third lens unit moving for focusing differently from each other to change a distance between each pair of adjacent lens units, wherein
the first lens unit includes, in order from the object side to the image side, a first lens having a negative refractive power and a second lens having a negative refractive power, and
conditional expressions $$3.3 < f1/f < 12.8,$$

$$0.0 < f3/f2 < 0.5, \text{ and}$$

$$0.4 < |m2|/|m3| < 1.0$$

are satisfied where f represents a focal length of the fixed focal length lens in a case of focusing on an object at infinity, f1 represents a focal length of the first lens unit, f2 represents a focal length of the second lens unit, f3 represents a focal length of the third lens unit, and m2 and m3 respectively represent a movement amount of the second lens unit and a movement amount of the third lens unit when shifting from a case of focusing on an object at infinity to a case of focusing on an object at a minimum object distance.

2. The fixed focal length lens according to claim 1, wherein
a conditional expression $$0.1 < f/TD < 0.3$$

is satisfied where f represents a focal length of the fixed focal length lens in a case of focusing on an object at infinity and TD represents a length on an optical axis from a lens surface arranged closest to the object side to a lens surface arranged closest to the image side.

3. The fixed focal length lens according to claim 1, wherein
a conditional expression $$1.5 < LB1/f < 4.0$$

is satisfied where f represents a focal length of the fixed focal length lens in a case of focusing on an object at infinity and LB1 represents a total length of the first lens unit.

4. The fixed focal length lens according to claim 1, wherein the first lens unit includes at least two aspherical surfaces.

5. The fixed focal length lens according to claim 1, wherein
a conditional expression $$2.0 < LB1/f < 4.0$$

is satisfied where f represents a focal length of the fixed focal length lens in a case of focusing on an object at infinity and LB1 represents a total length of the first lens unit.

6. The fixed focal length lens according to claim 1, wherein
a conditional expression $$0.1 < f/TD\ 0.2$$

is satisfied where f represents a focal length of the fixed focal length lens in a case of focusing on an object at infinity and TD represents a length on an optical axis from a lens surface arranged closest to the object side to a lens surface arranged closest to the image side.

7. The fixed focal length lens according to claim 1, wherein
a conditional expression $$0.4 < |m2|/|m3| \leq 0.82$$

is satisfied where m2 and m3 respectively represent a movement amount of the second lens unit and a movement amount of the third lens unit when shifting from a case of focusing on an object at infinity to a case of focusing on an object at a minimum object distance.

8. A fixed focal length lens comprising, in order from an object side to an image side, a first lens unit having a positive refractive power, a second lens unit having a positive refractive power, a third lens unit having a positive refractive power and a fourth lens unit, the second lens unit and the third lens unit moving for focusing differently from each other to change a distance between each pair of adjacent lens units, wherein conditional expressions:

$$3.3 < f1/f < 12.8,$$

$$0.0 < f3/f2 < 0.5, \text{ and}$$

$$0.4 < |m2|/|m3| < 1.0$$

are satisfied where f represents a focal length of the fixed focal length lens in a case of focusing on an object at infinity, f1 represents a focal length of the first lens unit, f2 represents a focal length of the second lens unit, f3 represents a focal length of the third lens unit, and m2 and m3 respectively represent a movement amount of the second lens unit and a movement amount of the third lens unit when shifting from a case of focusing on an object at infinity to a case of focusing on an object at a minimum object distance.

9. The fixed focal length lens according to claim 8, wherein
the first lens unit includes, in order from the object side to the image side, a first lens having a negative refractive power and a second lens having a negative refractive power.

10. The fixed focal length lens according to claim 8, wherein
a conditional expression $$0.1 < f/TD < 0.3$$

is satisfied where f represents a focal length of the fixed focal length lens in a case of focusing on an object at infinity and TD represents a length on an optical axis from a lens surface arranged closest to the object side to a lens surface arranged closest to the image side.

11. The fixed focal length lens according to claim 8, wherein the first lens unit includes at least two aspherical surfaces.

12. The fixed focal length lens according to claim 8, wherein
a conditional expression $$1.5 < LB1/f < 4.0$$

is satisfied where f represents a focal length of the fixed focal length lens in a case of focusing on an object at infinity and LB1 represents a total length of the first lens unit.

13. The fixed focal length lens according to claim 8, wherein
a conditional expression $$2.0 < LB1/f < 4.0$$

is satisfied where f represents a focal length of the fixed focal length lens in a case of focusing on an object at infinity and LB1 represents a total length of the first lens unit.

14. The fixed focal length lens according to claim 8, wherein
a conditional expression $$0.1 < f/TD \leq 0.2$$

is satisfied where f represents a focal length of the fixed focal length lens in a case of focusing on an object at infinity and TD represents a length on an optical axis from a lens surface arranged closest to the object side to a lens surface arranged closest to the image side.

15. The fixed focal length lens according to claim 8, wherein
a conditional expression $$0.4 < |m2|/|m3| \leq 0.82$$

is satisfied where m2 and m3 respectively represent a movement amount of the second lens unit and a movement amount of the third lens unit when shifting from a case of focusing on an object at infinity to a case of focusing on an object at a minimum object distance.

16. An image pickup apparatus comprising:
a fixed focal length lens including, in order from an object side to an image side, a first lens unit having a positive refractive power, a second lens unit having a positive refractive power and a third lens unit having a positive refractive power, the second lens unit and the third lens unit moving for focusing differently from each other to change a distance between each pair of adjacent lens units, wherein
the first lens unit includes, in order from the object side to the image side, a first lens having a negative refractive power and a second lens having a negative refractive power, and
conditional expressions $3.3 < f1/f < 12.8,$ $0.0 < f3/f2 < 0.5$ and $0.4 < |m2|/|m3| < 1.0$ are satisfied where f represents a focal length of the fixed focal length lens in a case of focusing on an object at infinity, f1 represents a focal length of the first lens unit, f2 represents a focal length of the second lens unit f3 represents a focal length of the third lens unit, and m2 and m3 respectively represent a movement amount of the second lens unit and a movement amount of the third lens unit when shifting from a case of focusing on an object at infinity to a case of focusing on an object at a minimum object distance; and
an image pickup element arranged on an image plane of the fixed focal length lens.

17. An image pickup apparatus comprising:
a fixed focal length lens including, in order from an object side to an image side, a first lens unit having a positive refractive power, a second lens unit having a positive refractive power, a third lens unit having a positive refractive power and a fourth lens unit, the second lens unit and the third lens unit moving for focusing differently from each other to change a distance between each pair of adjacent lens units, wherein
conditional expressions $3.3 < f1/f < 12.8,$ $0.0 < f3/f2 < 0.5$ and $0.4 < |m2|/|m3| < 1.0$ are satisfied where f represents a focal length of the fixed focal length lens in a case of focusing on an object at infinity, f1 represents a focal length of the first lens unit, f2 represents a focal length of the second lens unit, and m2 and m3 respectively represent a movement amount of the second lens unit and a movement amount of the third lens unit when shifting from a case of focusing on an object at infinity to a case of focusing on an object at a minimum object distance; and
an image pickup element arranged on an image plane of the fixed focal length lens.

* * * * *